(12) United States Patent
Jeong et al.

(10) Patent No.: US 8,009,542 B2
(45) Date of Patent: Aug. 30, 2011

(54) APPARATUS FOR RECORDING/REPRODUCING HOLOGRAPHIC DATA

(75) Inventors: Taek-seong Jeong, Suwon-si (KR); Jae-cheol Bae, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 448 days.

(21) Appl. No.: 12/325,002

(22) Filed: Nov. 28, 2008

(65) Prior Publication Data

US 2009/0174920 A1  Jul. 9, 2009

(30) Foreign Application Priority Data

Jan. 9, 2008 (KR) .................. 10-2008-0002650

(51) Int. Cl.
*G11B 7/00* (2006.01)
(52) U.S. Cl. .......................... 369/103; 359/22
(58) Field of Classification Search .............. 359/22, 359/24; 369/103
See application file for complete search history.

(56) References Cited

U.S. PATENT DOCUMENTS

| | | |
|---|---|---|
| 2005/0270609 A1 | 12/2005 | Chuang et al. |
| 2007/0211321 A1* | 9/2007 | Hoskins et al. .............. 359/24 |
| 2008/0100890 A1* | 5/2008 | Curtis et al. .............. 359/3 |

FOREIGN PATENT DOCUMENTS

| | | |
|---|---|---|
| JP | P2007-149251 A | 6/2007 |
| JP | P2007-149252 A | 6/2007 |
| JP | P2007-149254 A | 6/2007 |
| JP | P2007-240820 A | 9/2007 |

OTHER PUBLICATIONS

International Search Report dated Jul. 29, 2009 in PCT International Application No. PCT/KR2009/000079.

* cited by examiner

*Primary Examiner* — Alessandro Amari
(74) *Attorney, Agent, or Firm* — NSIP Law

(57) ABSTRACT

A holographic information recording and/or reproducing apparatus includes: a light source to emit light; a polarization conversion device to form a polarized signal beam and an orthogonal polarized reference beam; an optical path forming optical system to separate the optical paths of the signal beam and the reference beam; a focus adjustment optical system disposed on the optical path of at least one of the signal beam and the reference beam, and to vary a position of a focus of at least one of the signal beam and the reference beam in a depth direction of the holographic information storage medium; an objective lens to focus the signal beam and the reference beam in the holographic information storage medium, and form an interference pattern to record information; and a 4f relay system disposed on an optical path between the focus adjustment optical system and the objective lens.

23 Claims, 10 Drawing Sheets

APPARATUS FOR RECORDING/REPRODUCING HOLOGRAPHIC DATA

CROSS-REFERENCE TO RELATED APPLICATION

This application claims all benefits accruing under 35 U.S.C. §119 from Korean Patent Application No. 2008-2650, filed on Jan. 9, 2008, in the Korean Intellectual Property Office, the disclosure of which is incorporated herein by reference.

BACKGROUND OF THE INVENTION

1. Field of the Invention

The present invention relates to a holographic information recording and/or reproducing apparatus, and more particularly, to a single-side-incidence holographic information recording and/or reproducing apparatus in which a signal beam and a reference beam are incident on the same surface of a holographic data storage medium.

2. Description of the Related Art

Recording information in a holographic data storage comprises storing information in the form of an interference pattern in a material, such as, a photopolymer, which reacts according to intensity of light. The interference pattern is formed by using two laser beams. That is, the interference pattern is formed by a reference beam and a signal beam interfering with each other and incident on a photosensitive storage medium. The interference pattern causes chemical or physical changes in the photosensitive storage medium, and thus information can be recorded. In order to reproduce information from the recorded interference pattern, a reference beam similar to the beam used when the information was recorded is emitted (or irradiated) to the interference pattern recorded in the photosensitive storage medium. The emitted reference beam is diffracted by the interference pattern, thereby restoring (or reproducing) a signal beam, and thus reproducing the information.

Recording methods using this hologram technology include a volume holographic method in which information is recorded and/or reproduced in units of pages, and a microholographic method in which information is recorded and/or reproduced in units of single bits. Although the volume holographic method has an advantage in that a large amount of information can be processed at the same time, it is difficult for the method to be commercialized and adapted to an information storage apparatus for general consumer use because an optical system should be very precisely adjusted.

Meanwhile, in the microholographic method, two condensed light beams are made to interfere with each other at the focal points of the beams, thereby forming a fine interference pattern. Then, by moving this interference pattern across the plane of a storage medium, a plurality of patterns are recorded to form a recording layer. By superimposing the recording layers in the depth direction of the storage medium, patterns are recorded, thereby recording information in a 3-dimensional (3D) manner.

However, a typical microholographic recording and/or reproducing apparatus is provided with multiple optical systems for generating a signal beam and a reference beam, i.e., an optical system for a signal beam and an optical system for a reference beam on each side (or opposite sides) of a storage medium, respectively. The multiple optical systems are cost prohibitive and are complicated to arrange for precision, and increase the size of the apparatus.

Also, in the field of optical recording devices, to increase capacity, necessity for increasing the storage capacity and transmission rate of information storage media and necessity for recording and/or reproducing multiple channels also increase. In order to satisfy these needs, implementation of a fast access time for the system and the storage medium is necessary.

SUMMARY OF THE INVENTION

The present invention provides a holographic information recording and/or reproducing apparatus capable of implementing a fast access time, and using a single-side-incidence method in which a signal beam and a reference beam are incident on the same surface of a holographic information storage medium.

Additional aspects and/or advantages of the invention will be set forth in part in the description which follows and, in part, will be obvious from the description, or may be learned by practice of the invention.

According to an aspect of the present invention, there is provided a holographic information recording and/or reproducing apparatus for use with a holographic information storage medium. Such an apparatus includes: a light source to emit light; a first polarization conversion device, during a recording mode, to form a polarized signal beam and a polarized reference beam that are orthogonal polarization to each other from the light emitted from the light source; an optical path forming optical system to separate the optical paths of the signal beam and the reference beam so that the signal beam and the reference beam proceed along respective paths, and then, to combine the optical paths; a focus adjustment optical system disposed on the optical path of at least one of the signal beam and the reference beam in the optical path forming optical system, and to vary the position of a focus of at least one of the signal beam and the reference beam in a depth direction of the holographic information storage medium; an objective lens to focus the signal beam and the reference beam within the holographic information storage medium, to thereby form an interference pattern thereof and to record information in the form of the interference pattern on the holographic information storage medium; and a 4f relay system disposed on an optical path between the focus adjustment optical system and the objective lens to maintain a predetermined optical distance between the focus adjustment system and the objective lens.

According to an aspect of the present invention, the focus adjustment optical system may include a first focus adjustment optical system and a second focus adjustment optical system disposed on the optical paths of the signal beam and the reference beam, respectively, in which the signal beam and the reference beam proceed independently, and wherein the 4f relay system may be disposed on each of the optical path between the first focus adjustment optical system and the objective lens in which the signal beam proceeds, and the optical path between the second focus adjustment optical system and the objective lens in which the reference beam proceeds.

According to an aspect of the present invention, the 4f relay system may include: a polarization beam splitter; a first wave plate and a second wave plate disposed at both sides of the polarization beam splitter; a first mirror and a second mirror disposed at the outside of the first and second wave plates with predetermined gaps; and a condensing lens disposed between the first wave plate and the first mirror, or between the second wave plate and the second mirror.

According to an aspect of the present invention, the optical pickup is provided with a separation optical system that is movably attached to the optical pickup, and includes the objective lens, wherein a position of one of the first and second mirrors is adjusted according to a movement of the separation optical system.

According to an aspect of the present invention, the holographic information storage medium may include a recording layer and a reflection layer, and the reference beam and the signal beam may be emitted through a single-side surface of the holographic information storage medium, the signal beam may pass through the recording layer, be reflected by the reflection layer, and then, be condensed in the recording layer, and the reference beam may be directly condensed in the recording layer of the holographic information storage medium.

According to an aspect of the present invention, the first polarization conversion device may be an active polarization conversion device which, during the recording mode, converts the polarization of a beam of light emitted from the light source to include two polarized beams that are orthogonal to each other, and during a reproduction mode, transmits the beam of light emitted from the light source without changing the polarization thereof.

According to an aspect of the present invention, the optical path forming optical system may include: a first optical path changer to separate a beam that is incident thereon from the first polarization conversion device into a first beam and a second beam according to the polarization of the incident beam; a second optical path changer disposed at a location where the first and second beams separated by the first optical path changer intersect, and to separate a beam that is incident thereon according to the polarization of the incident beam; a first mirror and a second mirror to change the optical paths of the first beam and the second beam, respectively, that are separated by the first optical path changer so that the first and second beams can be incident on the second optical path changer while intersecting each other; a first and second half wave plates disposed on one of the optical paths of the first and second beams, and to the sides of the second optical path changer, so that the first and second beams pass through the second optical path changer in identical polarization states; and an optical path combining unit to combine the optical paths of the first and second beams that pass through the second optical path changer, wherein one of the first and second beams is the signal beam and the other is the reference beam.

According to an aspect of the present invention, the optical path combining unit may include: a third optical path changer to unconditionally reflect a beam incident from the second optical path changer; a third mirror to change the optical path of one of the first and second beams, the one beam being not directed to the third optical path changer from the second optical path changer; and a fourth optical path changer to combine the optical paths of the first and second beams having different polarizations that are intersectingly incident on the fourth optical path changer due to the third optical path changer and the third mirror, respectively.

According to an aspect of the present invention, the first or second half wave plates on which the first or second beam incident on the second optical path changer from the first optical path changer meets after passing through the second optical path changer, may be an active wave plate which, during the recording mode, operates to convert polarization of a beam that is incident thereto, and during the reproduction mode, operates to transmit a beam that is incident thereto without polarization change.

According to an aspect of the present invention, the reflection layer of the holographic information storage medium may reflect a beam incident on the holographic information storage medium without a polarization change.

According to an aspect of the present invention, the first polarization conversion device may be an active wave plate which converts an incident beam into a polarized signal beam and a polarized reference beam that are orthogonal to each other only in a recording mode, a quarter wave plate may be further included between the objective lens and the optical path forming optical system, and the signal beam and the reference beam proceeding from the optical path forming optical system to the quarter wave plate may have linear polarizations that are orthogonal to each other.

According to an aspect of the present invention, the apparatus may further include a first photodetector to receive a reproduction beam that is reproduced from the holographic information storage medium in the reproduction mode.

According to an aspect of the present invention, the first or second half wave plates, on which the first or second beam that are incident thereto from the first optical path changer to the second optical path changer is incident after passing through the second optical path changer, may convert a passing beam to a beam comprising a main polarization component and a different polarization component so that in the recording mode, the signal beam reflected by the holographic information storage medium is detected in the first photodetector.

According to an aspect of the present invention, the apparatus further includes a second polarization conversion device on an optical path in which the optical paths of the signal beam and the reference beam are combined by the optical path combining unit, the holographic information storage medium may be formed to convert the polarization state of a beam that is incident on the reflection layer into a different polarized state when the beam is reflected, and the first polarization conversion device may include: a first transparent area to transmit a passing beam without a polarization change irrespective of the recording mode or the reproduction mode; and a first polarization conversion area to convert a polarization of the passing beam only in the recording mode, and the second polarization conversion device may include: a second transparent area to transmit a passing beam without polarization change irrespective of the recording mode or the reproduction mode; and a second polarization conversion area to convert a polarization of the passing beam only in the recording mode.

According to an aspect of the present invention, the apparatus may further include a quarter wave plate to convert the polarization of an incident beam that is incident thereto, and is disposed between the objective lens and the optical path forming optical system, wherein, during the recording mode, the signal beam and the reference beam proceeding to the quarter wave plate from the optical path forming optical system have the same linear polarizations.

According to an aspect of the present invention, the apparatus may further include a first photodetector to receive a reproduction light reproduced from the holographic information storage medium in the reproduction mode.

According to an aspect of the present invention, the apparatus may be formed such that, during the recording mode, a beam reflected by the holographic information storage medium is returned to the first optical path changer through an optical path not passing through the first and second half wave plates, and may further include a third optical path changer which, during the recording mode, separates an optical path of the beam reflected by the holographic information storage medium from the optical path of the beam emitted from the light source so that the reflected beam is not directed to the light source; and a second photodetector to detect a beam which, during the recording mode, returns from the holographic information storage medium and is separated in the third optical path changer from the reflected beam.

According to an aspect of the present invention, a method of recording information in a holographic information storage medium uses a holographic information recording and/or reproducing apparatus comprising a light source, a polarization conversion device, an optical path forming optical system, a focus adjustment optical system, an objective lens, and a 4f relay system disposed on an optical path between the focus adjustment optical system and the objective lens, so that the method includes: emitting light from the light source; forming a signal beam and a reference beam that are orthogonal to each other from the light emitted from the light source using the polarization conversion device; separating the signal beam and the reference beam using the optical path forming optical system so that the signal beam and the reference beam proceed along respective paths, and then, to combine the optical paths thereof; focusing the signal beam and the reference beam within the holographic information storage medium using the objective lens, to thereby form an interference pattern thereof and to record information in the form of the interference pattern on the holographic information storage medium; varying a position of a focus of at least one of the signal beam and the reference beam in a depth direction of the holographic information storage medium using a focus adjustment optical system; and maintaining a predetermined optical distance between the focus adjustment optical system and the objective lens using the 4f relay system.

According to an aspect of the present invention, provided is a holographic information recording and/or reproducing apparatus for use with a holographic information storage medium, the apparatus including: an optical system to generate a signal beam and a reference beam, and to separate optical paths of the signal beam and the reference beam to proceed along respective paths; a focus adjustment optical system disposed on an optical path of at least one of the signal beam and the reference beam, and to vary the position of a focus of at least one of the signal beam and the reference beam in a depth direction of the holographic information storage medium; an objective lens to focus the signal beam and the reference beam within the holographic information storage medium, to thereby form an interference pattern to record information on the holographic information storage medium; and a 4f relay system disposed on an optical path between the focus adjustment optical system and the objective lens to maintain a predetermined optical distance between the focus adjustment optical system and the objective lens.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
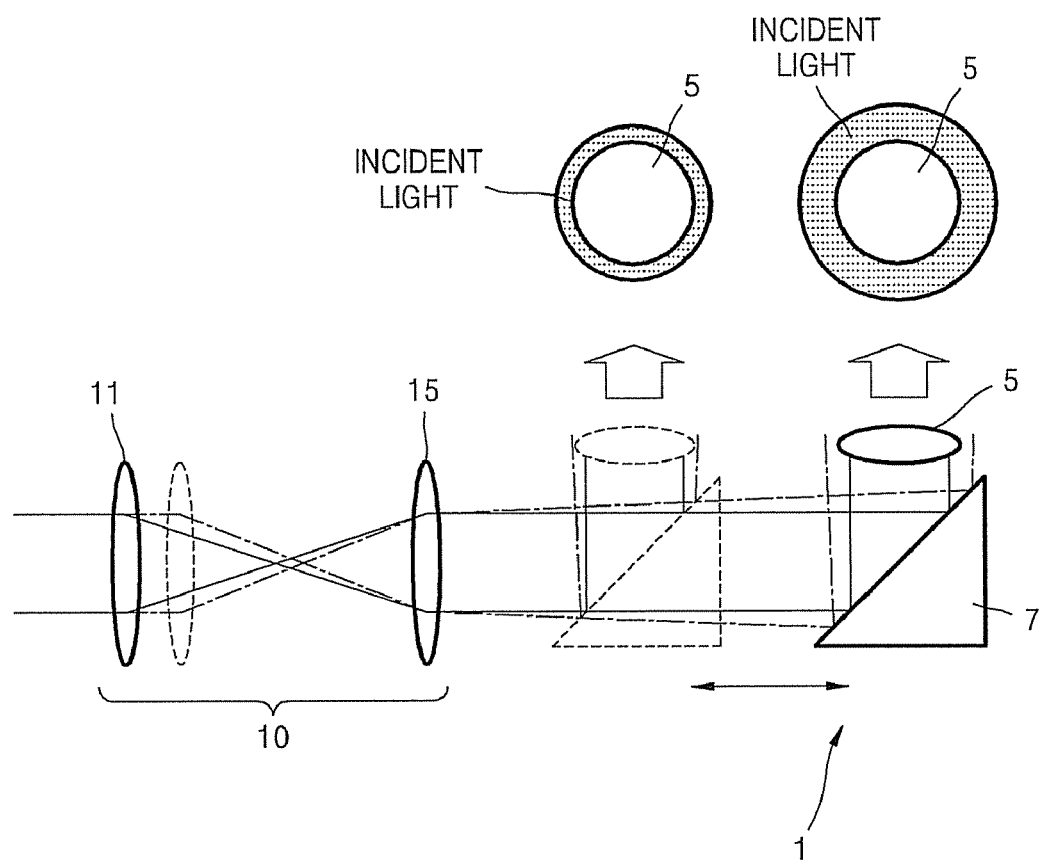
FIG. 1 is a schematic diagram illustrating optical path variations of a light beam incident on an objective lens, occurring when the position of the objective lens is moved by adjusting a focus in a separation-type optical system having a focus adjustment optical system.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A holographic information recording and/or reproducing apparatus of the present invention is an apparatus for recording information using a single-side-incidence method on a holographic information storage medium and reproducing the recorded information therefrom, and includes an optical construction or a device in which a signal beam and a reference beam are incident on the same surface of the holographic information storage medium. The holographic information storage medium used in the holographic information recording and/or reproducing apparatus of the present invention is a reflection-type holographic information storage medium having a recording layer and a reflection layer.

In the single-side-incident method, a signal beam is reflected by a reflection film inside an information storage medium (holographic information storage medium), generating a focus at the same position as that of a reference beam and causes interference, thereby recording a hologram. In this case, divergence or convergence of the signal beam and the reference beam are adjusted by a lens system so that the focuses of the signal beam and the reference beam can match.

While the matching positions of the focuses of the signal beam and the reference beam is varied in the depth direction in the information storage medium, by adjusting the lens system, if information is recorded in a 3D manner, by superimposing layers in which interference patterns are recorded, in the depth direction of the information storage medium, a plurality of recording layers in which information is recorded can be generated.

Thus, recorded information can be reproduced by emitting (irradiating) a reference beam to the interference pattern. Since the signal beam and the reference beam proceed in opposite directions to form the interference pattern, a reproduced signal beam is generated such that the reproduced signal beam proceeds in a different direction to that of the incident reference beam. Accordingly, the thus reproduced signal beam is detected by using a photodetector, and is converted into a signal.

Meanwhile, in terms of increasing capacity, the necessity to increase the storage capacity and transmission rate of an information storage medium and the necessity for recording and/or reproducing multiple channels also increase. In order to satisfy these needs, a separation-type optical system (also referred to as separation optical system or a detached optical system) needs to be implemented so that a fast access time can be achieved. In the separation-type optical system, most parts of an optical pickup, such as a light source and a photodetector, are fixed and only an objective lens and some optical components are separated (i.e., not fixed or movable) so as to move light from the light source along an inner circumference and an outer circumference of an information storage medium.

Since a holographic information recording and/or reproducing apparatus is formed by a plurality of optical components, if a single-body-type optical system is used to move the whole optical pickup, the volume of the optical system is large, and the weight is heavy, the access time is increased.

Meanwhile, when the separation-type optical system is applied, an optical system using a focus adjustment optical system 10 as illustrated in FIG. 1 becomes a finite optical system. Accordingly, as the distance between the focus adjustment optical system 10 and the objective lens 5 changes when adjusting a focus when moving the light between an inner circumference and an outer circumference, it becomes difficult to compensate for aberration. Also, when moving the light between an inner circumference and an outer circumference, the amount of light incident on the objective lens 5 changes so as to cause a problem.

FIG. 1 is a schematic diagram illustrating changes that occur to a light beam traveling to the objective lens 5 when the position of a separation-type optical system 1, including the objective lens 5, is moved by adjusting a focus of a focus adjustment optical system 10.

Referring to FIG. 1, the focus adjustment optical system 10 is an example relay lens system formed by two condensing lenses 11 and 15, and shown is an example in which one condensing lens 11 is moved to adjust a focus. In FIG. 1, reference number 7 indicates a reflection mirror for bending (or changing) the proceeding path (or propagating path) of a light beam.

As can be known from FIG. 1, in a finite optical system, since a diverging or converging beam is incident on the objective lens 5, if the objective lens 5 moves back and forth relative to the condensing lenses 11 and 15, the size of an incident light beam proceeding to the objective lens 5 changes and the light amount per unit area of a light beam passing through the objective lens 5 changes. In this case, since the effective diameter of the objective lens 5 is constant, the light amount passing through the objective lens 5 changes.

In general, when a hologram is recorded, only if the light intensity of two interfering beams is identical to each other, the biggest diffraction signal occurs. However, since the change in the light amount occurs by the reason as described above, a problem arises in which the magnitude of a reproduction signal changes.

A holographic information recording and/or reproducing apparatus according to an embodiment of the present invention is constructed such that the change in the light amount of a beam incident on an objective lens according to movement in an optical system can be reduced. Also, the holographic information recording and/or reproducing apparatus according to an embodiment of the present invention is constructed such that compensation of aberration can be easily performed when a separate-type optical system is implemented in order to reduce an access time.

Figure 2:
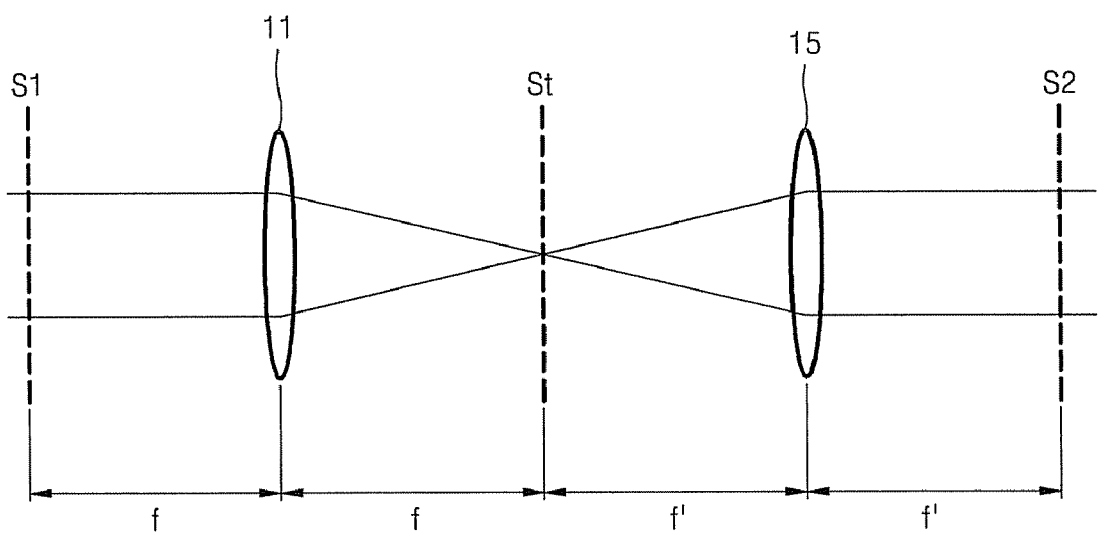
FIG. 2 is a schematic diagram illustrating a working principle of a 4f system.
Figure 3:
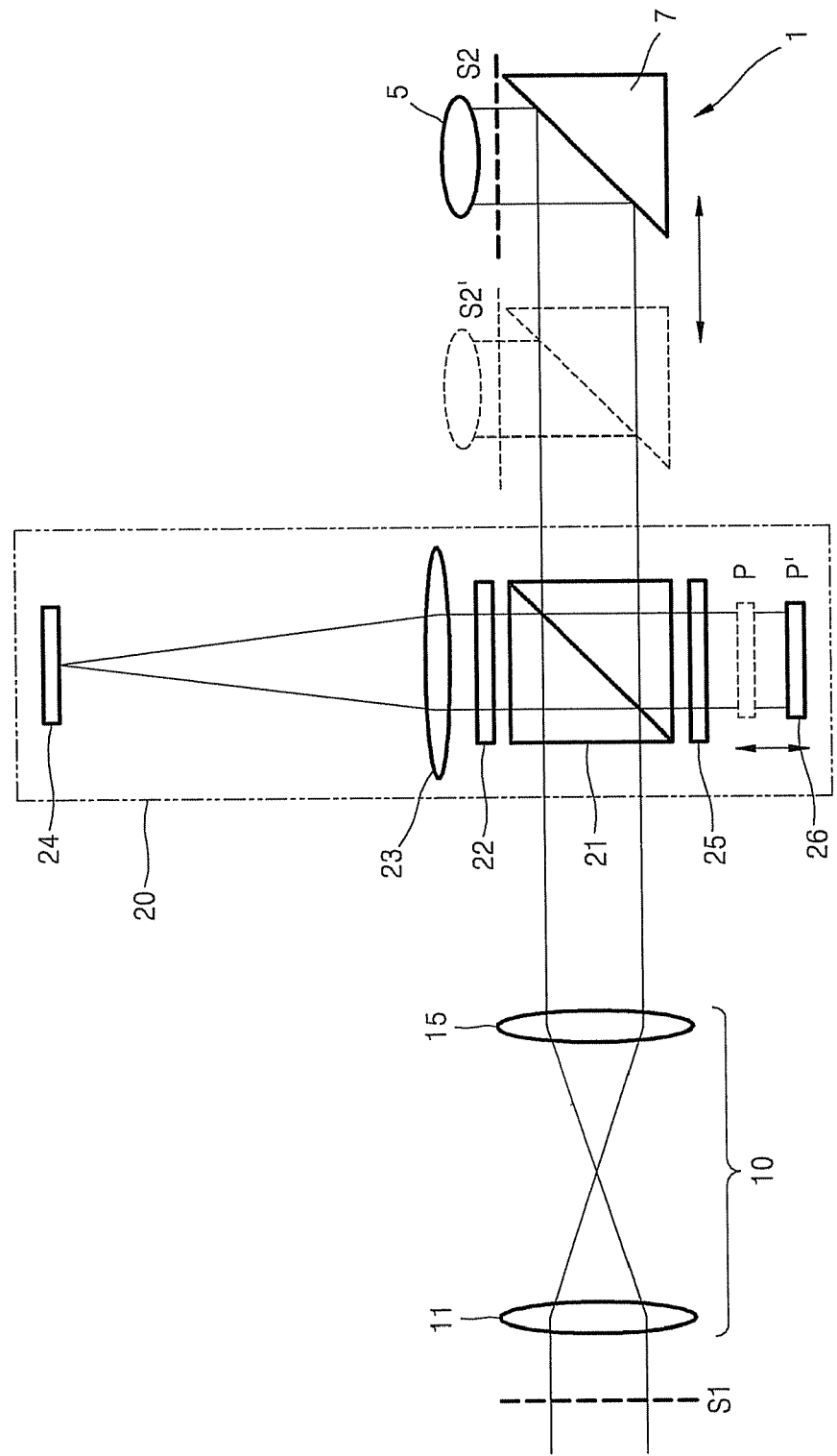
FIG. 3 is a schematic diagram illustrating a structure to which a 4f relay system is applied between a focus adjustment optical system and an objective lens so that a change in the amount of light of a beam incident on the objective lens according to the movement of an optical system can be reduced, according to an embodiment of the present invention.

FIG. 2 is a schematic diagram illustrating a working principle of a 4f system, and FIG. 3 is a schematic diagram illustrating a structure (referred to as a 4f relay system) according to an embodiment of the present invention to which a 4f system is applied between a focus adjustment optical system 10 and an objective lens 5 so that a change in the light amount of a beam incident on the objective lens 5 according to the movement of an optical system can be reduced.

Referring to FIG. 2, in a 4f system, the distance between an object plane (S1) and a first lens (or lens group) 11 is f, the distance between the first lens 11 and a second lens 15 is f+f', and the distance between the second lens 15 and an image plane (S2) is f'. In this case, f and f' denote the focal distances of the first lens 11 and the second lens 15, respectively. In FIG. 2, St indicates a common focal plane of the two lenses 11 and 15.

The 4f system performs a role of transferring an image (light) of the S1 plane to the S2 plane without change. That is, the image of the S1 plane is Fourier-transformed to the St plane by the first lens 11, and the transformed result is again transformed by the second lens 15, thereby generating an image identical to the original image on the S2 plane. However, since the size of the image may vary with respect to the ratio of f/f', f and f' may be made to be identical in order to transfer an image without change.

Referring to FIG. 3, when a 4f relay system 20 is applied to between a focus adjustment optical system 10 and a separation-type optical system 1 including an objective lens 5, the 4f relay system 20 according to an embodiment of the present invention may include: a polarization beam splitter 21; a first wave plate 22 and a second wave plate 25 disposed to both sides of the polarization beam splitter 21; a first mirror 24 and a second mirror 26 disposed to the outsides of the first and second wave plates 22 and 25, respectively, with predetermined gaps from the respective wave plates; and a condensing lens 23 disposed between the first wave plate 22 and the first mirror 24 or between the second wave plate 25 and the second mirror 26. Also, when a separation-type optical system 1 in which only predetermined parts of optical system, including the objective lens 5, move is included in the structure, a 1D driving mirror is disposed as at least one of the first and second mirrors 24 and 26. By doing so, when the separation-type optical system 1 moves (back and forth relative to the 4f relay system 20, as shown by a horizontal arrow), the position of the 1D driving mirror is adjusted (back and forth relative to the polarization beam splitter 21, as shown by a vertical arrow) so as to be in proportion to the moving distance of the separation-type optical system 1, and the optical distance between the focus adjustment optical system 10 and the objective lens 5 can be maintained without change.

FIG. 3 illustrates an example in which a 1D driving mirror is disposed as the second mirror 26 and the condensing lens 23 is disposed between the first mirror 24 and the first wave plate 22. As the first and second wave plates 22 and 25, quarter wave plates relative to the wavelength of an incident light can be disposed.

Although an example in which a holographic information recording and/or reproducing apparatus includes a separation-type optical system is explained with reference to FIG. 3 and in embodiments to be explained below, this is just an example, and the present invention is not limited to this. The 4f relay system according to an embodiment of the present invention can be applied to a variety of systems which need to maintain the optical distance between a focus adjustment optical system 10 and an objective lens 5.

Figure 4:
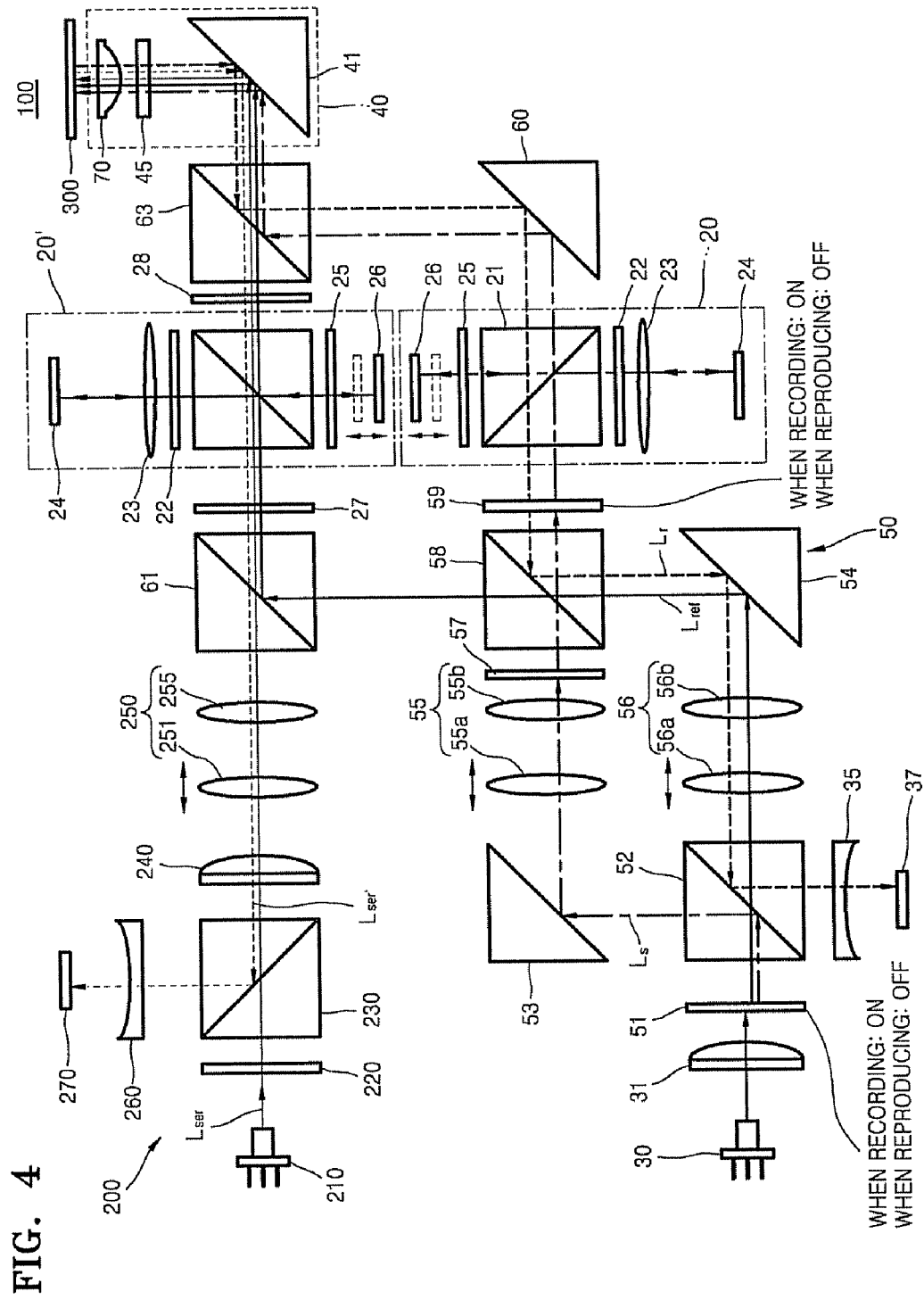
FIG. 4 is a schematic diagram illustrating an optical structure of a holographic information recording and/or reproducing apparatus according to an embodiment of the present invention.
Figure 5:
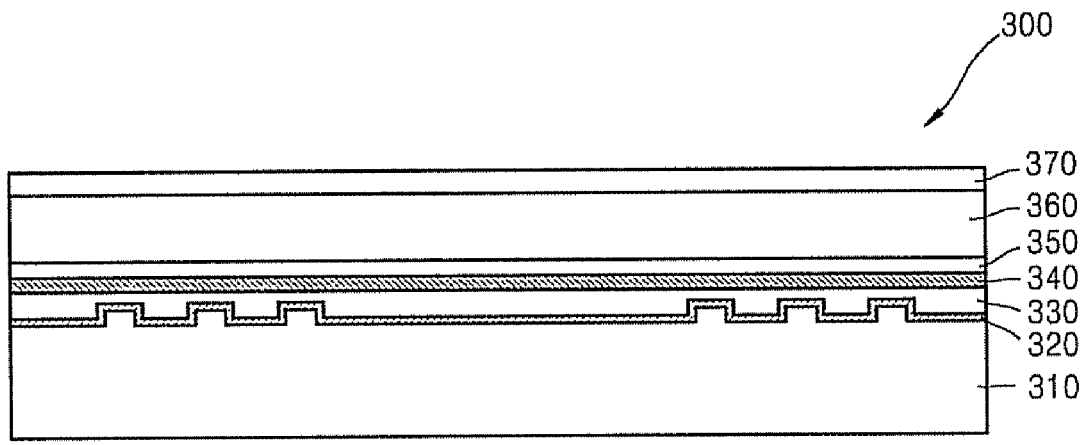
FIG. 5 is a diagram illustrating a reflection-type holographic information storage medium used in a holographic information recording and/or reproducing apparatus according to an embodiment of the present invention.

FIG. 4 is a schematic diagram illustrating an optical structure of a holographic information recording and/or reproducing apparatus 100 according to an embodiment of the present invention, and FIG. 5 is a diagram illustrating an example of a reflection-type holographic information storage medium used in a holographic information recording and/or reproducing apparatus according to an embodiment of the present invention. Referring to FIG. 4, examples of optical paths of a signal beam (Ls), a reference beam (Lref), a reproduction beam (Lr), a beam (Lser) used to implement a servo, and a beam (Lser') which includes servo information and is returning after being reflected off a holographic information storage medium 300 are illustrated.

Referring to FIG. 4, the holographic information recording and/or reproducing apparatus 100 includes: a first light source 30 to emit light of a predetermined wavelength; a polarization conversion device 51, in a recording mode, to form a polarized signal beam (Ls) and a polarized reference beam (Lref) which are orthogonal to each other and incident on the same surface of a holographic information storage medium 300 from light emitted from the first light source 30; an optical path forming optical system 50 to separate the optical paths of the signal beam (Ls) and the reference beam (Lref) formed as polarized beams orthogonal to each other by the polarization conversion device 51, to make the signal beams (Ls) and the reference beam (Lref) travel through the respective paths, and then, to combine the optical paths; an objective lens 70 to focus the signal beam (Ls) and the reference beam (Lref) in the holographic information storage medium 300, thereby to form an interference pattern and to record information in the form of the interference pattern; a focus adjustment optical system 55 or 56 disposed on the optical path of at least one of the signal beam and the reference beam in the optical path forming optical system 50, and to vary the position of the focus of at least one of the signal beam and the reference beam in the depth direction of the holographic information storage medium 300; and a 4f relay system disposed on an optical path between the focus adjustment optical system 55 or 56 and the objective lens. Meanwhile, the holographic information recording and/or reproducing apparatus of the present invention may further include a servo optical system 200 to read servo information. An example in which the holographic information recording and/or reproducing apparatus according to the current embodiment includes the servo optical system 200 to read servo information will now be explained.

The first light source 30 can emit generally a linearly polarized light beam. For example, a laser diode (LD) to emit a blue light beam may be used as the first light source 30. In a recording mode, according to information desired to be recorded, the first light source 30 emits, for example, a modulated P-polarized beam ($L_m$), and in a reproduction mode, the first light source 30 can operate so as to emit a non-modulated P-polarized beam ($L_{nm}$).

The light beam emitted from the first light source 30 is collimated by a collimating lens 31, and is incident on the polarization conversion device 51. In a recording mode, the polarization conversion device 51 changes the polarization of the light emitted from the first light source 30 to include two polarized beam orthogonal to each other.

As the polarization conversion device 51, an active polarization conversion device may be used. For example, as the polarization conversion device 51, an active wave plate such as an active half wave plate or an active quarter wave plate may be used. When an active wave plate is used, the polarization conversion device 51 performs a function as a wave plate in a recording mode, thereby converting the light emitted from the first light source 30 to include two linearly polarized beams orthogonal to each other, and does not perform the function as a wave plate in a reproduction mode, thereby allowing the light emitted from the first light source 30 to pass directly. Of the light converted to include the two linearly polarized beams when the light passes through the polarization conversion device 51, one linearly polarized beam, for example, an S-polarized beam, may be used as a signal beam (Ls) and the other, for example, a P-polarized beam, may be used as a reference beam (Lref).

In this case, the active wave plate may be a liquid crystal device using a double-refraction characteristic of a liquid crystal in which, if a voltage is provided, the liquid crystal is arranged to have an optical axis. For example, if the voltage is provided to an active half wave plate and the angle between the polarization direction of an incident predetermined linearly polarized beam and the optical axis, for example, a fast axis, of the active half wave plate is an angle other than 45 degrees, when the incident beam passes through the active half wave plate, the polarization direction of the incident beam is rotated and the beam is converted into two linearly polarized light components orthogonal to each other, that is, an S-polarized component and a P-polarized component. The beams of the S-polarized component and the P-polarized component that are obtained by polarization conversion can be used as a signal beam (Ls) and a reference beam (Lref), respectively, in a recording mode. In the case of an active quarter wave plate, when voltage is provided and the angle between an incident predetermined linearly polarized beam and the optical axis of the active quarter wave plate is 45 degrees, the beam is polarization-converted into a circularly polarized beam. Since this circularly polarized beam has two linear polarization components orthogonal to each other, the polarization components can be used as a signal beam (Ls) and a reference beam (Lref), respectively.

The optical path forming optical system 50 may include an optical structure in which the optical paths of the signal beam (Ls) and the reference beam (Lref) formed as polarized beams orthogonal to each other by the polarization conversion device 51 are separated and proceeded, and then, the optical paths are combined and the beams are made to be incident to the objective lens 70. That is, the optical path forming optical system 50 may include a first and second optical path changer 52 and 58, a first and second mirror 53 and 54, a first and second half wave plate 57 and 59, and an optical path combining unit.

Meanwhile, in the holographic information recording and/or reproducing apparatus, the focus adjustment optical system may include a first focus adjustment optical system 55 and a second focus adjustment optical system 56 disposed on the optical paths of the signal beam (Ls) and the reference beam (Lref), respectively, in which each beam travels independently. FIG. 4 illustrates an example in which the first and second focus adjustment optical systems 55 and 56 are disposed on the optical paths of the signal beam (Ls) and the reference beam (Lref), respectively, between the first and second optical path changers 52 and 58.

The first optical path changer 52 separates the light incident from the polarization conversion device 51 into a signal beam (Ls) and a reference beam (Lref) according to the polarization. The second optical path changer 58 is disposed at a location where the signal beam (Ls) and the reference beam (Lref) which are separated by the first optical path changer 52 and whose paths are bent by the first and second mirrors 53 and 54 intersect.

The signal beam (Ls) and the reference beam (Lref) split in the first optical path changer 52 can be incident on the second optical path changer 58 through the first and second focus adjustment optical systems 55 and 56, respectively. As the first and second optical path changers 52 and 58, a polarization beam splitter which is a polarization-selective optical path changing device can be used.

The first and second mirrors 53 and 54 bend the optical paths of the signal beam (Ls) and the reference beam (Lref) separated by the first optical path changer 52 so that the signal beam (Ls) and the reference beam (Lref) can be incident on the second optical path changer 58 and intersect each other.

The first and second half wave plates 57 and 59 can be disposed on the optical path of one of the signal beam (Ls) and the reference beam (Lref), respectively, to the sides of the second optical path changer 58 so that the signal beam (Ls) and the reference beam (Lref) can transmit or reflect off the second optical path changer 58, that intersects each other. One linearly polarized beam is converted to another linearly polarized beam by the first half wave plate 57 so that the signal beam (Ls) and the reference beam (Lref) can transmit the second optical path changer 58 in identical polarized beam states. The beam polarization-converted by the first half wave plate 57 and passing through the second optical path changer 58 is made to have the one linear polarization again by the second half wave plate 59. FIG. 4 illustrates an example in which the first and second half wave plates 57 and 59 are disposed so that both the signal beam (Ls) and the reference beam (Lref) can transmit the second optical path changer 58.

Hereinafter, assuming that the first and second optical path changers 52 and 58 are formed to transmit a P-polarized beam and reflect an S-polarized beam, and the S-polarized beam reflected from the first optical path changer 52 is used as a signal beam (Ls) and the transmitted P-polarized beam is used as a reference beam (Lref), the rest of the structure will be explained. However, this is one example of the present invention and the present invention is not limited to this. That is, a holographic information recording and/or reproducing apparatus according to the current embodiment can be optically structured so that the S-polarized beam reflected from the first optical path changer 52 can be used as a reference beam (Lref) and the P-polarized beam passing through the first optical path changer 52 can be used as a signal beam (Ls). Also, the first optical path changer 52 may be formed to reflect the P-polarized beam and transmit the S-polarized beam, and according to this, the rest of the optical structure may be configured. Since these variety of variations and embodiments can be sufficiently understood by a person skilled in the art of the present invention from the technical ideas of the present invention written in claims of the present application and explanation of the embodiment of the present invention with reference to FIG. 4, detailed explanation will be omitted here.

When the second optical path changer 58 transmits the P-polarized beam and reflects the S-polarized beam, a first half wave plate 57 to convert the S-polarized signal beam (Ls) into a P-polarized beam can be disposed before the second optical path changer 58 on which the S-polarized signal beam (Ls) is incident, and a second half wave plate 59 to convert the P-polarized signal beam (Ls) into an S-polarized beam can be disposed at the other side of the second optical path converter 58.

The second half wave plate 59 on which the beam incident on the second optical path changer 58 from the first optical path changer 52 meets after the second optical path changer 58 may include an active wave plate which operates so that in a reproduction mode can transmit an incident beam without polarization change. That is, an active half wave plate may be used as the second half wave plate 59. The S-polarized signal beam (Ls) reflected from the first optical path changer 52 is converted into a P-polarized beam in the first half wave plate, transmits the second optical path changer 58, and is incident on the second half wave plate 59. In a recording mode, the second half wave plate 59 operates as a half wave plate, thereby converting the incident P-polarized signal beam (Ls) into an S-polarized beam. In a reproduction mode, the second half wave plate 59 does not perform the function as a wave plate, and can transmit the S-polarized reproduction beam (Lr) from the holographic information storage medium 300 without polarization change as can be known from the illustrated path of the reproduction beam (Lr). Accordingly, in the reproduction mode, the reproduction beam (Lr) from the holographic information storage medium 300 is reflected by the second optical path changer 58.

Meanwhile, in order to detect part of a signal beam reflected by the holographic information storage medium 300, the second half wave plate 59 may be disposed such that the one linearly polarized beam is not completely converted into the other linearly polarized beam and part of the one linearly polarized beam component can remain unchanged. For example, if the fast axis of the second half wave plate 59 is 28.5 degrees, when the incident S-polarized beam passes through the second half wave plate 59, the polarization direction is rotated, and the beam can be converted into a beam having a main P-polarized component and a small S-polarized component.

The first focus adjustment optical system 55 changes the position of the focus of the signal beam (Ls) in the holographic information storage medium 300 in the depth direction and includes a plurality of lenses 55a and 55b. The second focus adjustment optical system 56 changes the position of the focus of the reference beam (Lref) in the holographic information storage medium 300 in the depth direction and includes a plurality of lenses 56a and 56b. At least one, for example, the lenses 55a and 56b, of each of the first and second focus adjustment optical systems 55 and 56 is installed such that the lens can be moved in the optical axis direction, thereby being driven by a driving unit (not shown). The first and second focus adjustment optical systems 55 and 56 change the positions of the focuses of the signal beam (Ls) and the reference beam (Lref), respectively, in the holographic information storage medium 300, thereby enabling information surfaces in the holographic information storage medium 300, on which information is recorded, to be formed as multiple layers.

The first and second focus adjustment optical systems 55 and 56, the two mirrors 53 and 54, the first and second half wave plates 57 and 59, and the second optical path changer 58 are disposed so that each of them can individually adjust the positions of the focuses of the signal beam (Ls) and the reference beam (Lref), and secure an optical path of the reproduction beam (Lr).

Meanwhile, the optical path combining unit is to combine the optical paths of the signal beam (Ls) and the reference beam (Lref) passing through the second optical path changer 58, and may include, for example, a third optical path changer 61 unconditionally (or indiscriminately) reflecting a beam incident from the second optical path changer 58, a third mirror 60 to bend the optical path of one of the signal beam (Ls) and the reference beam (Lref) which is not incident on the third optical path changer 61 from the second optical path changer 58, for example, the signal beam (Ls), thereby making the signal beam (Ls) and the reference beam (Lref) intersect each other, and a fourth optical path changer 63 to combine the incident paths of the signal beam (Ls) and the reference beam (Lref) which have different polarizations and intersect each other.

The P-polarized reference beam (Lref) passing through the second optical path changer 58 is incident on the third optical path changer 61. When a servo optical system 200 is disposed, the third optical path changer 61 may be a wavelength-selective beam splitter. As will be explained later, the light applied to the servo optical system 200 may have a different wavelength from the wavelength of the first light source 30 used for hologram recording or reproducing. Accordingly, when the servo optical system 200 is used, the third optical path changer 61 may be configured, for example, so that all the light emitted from the first light source 30 can be reflected irrespective of polarization, and all the light emitted from a second light source 200 of the servo optical system 200 can be transmitted irrespective of polarization. When the servo optical system 200 is not used, a simple mirror may be used as the third optical path changer 61.

The signal beam (Ls) converted into a P-polarized beam in the first half wave plate 57, transmitting the second optical path changer 58, and converted into an S-polarized beam when passing through the second half wave plate 59 is reflected by the third mirror 60, and incident on the fourth optical path changer 63. Accordingly, the optical path of the P-polarized reference beam (Lref) via the third optical path changer 61 and the optical path of the S-polarized signal beam (Ls) passing through the second half wave plate 59 are combined by the fourth optical path changer 63. As the fourth optical path changer 63, a wavelength and/or polarization selective polarization beam splitter which transmits or reflects the light emitted from the first light source 30 according to polarization and transmits the light emitted from the second light source 210 of the servo optical system 200 irrespective of polarization, can be used.

For example, the fourth optical path changer 63 can be configured so as to transmit the P-polarized reference beam (Lref) incident from the third optical path changer 61 and the light emitted from the second light source 210 of the servo optical system 200, and to reflect the S-polarized signal beam (Ls) incident from the second half wave plate and bent by the third mirror 60.

In this case, the positions of the servo optical system 200 and the third optical path changer 61 may be swapped for the position of the third mirror 60, and in such a case, the fourth optical path changer 63 can be configured so as to reflect the P-polarized reference beam (Lref) incident from the third optical path changer 61 and the servo light emitted from the second light source 210 of the servo optical system 200, and to transmit the S-polarized signal beam (Ls) incident from the second half wave plate 59 with its path bent by the third mirror 60.

Meanwhile, an information recording and/or reproducing apparatus according to an embodiment of the present invention may include a 4f relay system 20 and 20' on each of the optical paths of the signal beam (Ls) and the reference beam (Lref) via the first and second focus adjustment optical systems 55 and 56, in which each beam proceeds independently. FIG. 4 illustrates an example in which the 4f relay systems 20 and 20' are disposed in the optical path combining unit.

The 4f systems may also be disposed each of between the first focus adjustment optical system 55 and the second optical path changer 58 and between the second focus adjustment optical system 56 and the second optical path changer 58.

Since the signal beam (Ls) proceeding to the 4f relay system 20 has an S-polarized state, and the reference beam (Lref) proceeding to the 4f relay system 20' has a P-polarized state, when a pair of polarization conversion devices 27 and 28, capable of converting an incident linearly polarized beam into another orthogonal linearly polarized beam are disposed before and after the 4f relay system 20 or 20' in order to make the polarizations of the signal beam (Ls) and the reference beam (Lref) incident on the 4f relay systems 20 and 20', respectively, identical, the practical structures of the two 4f relay systems 20 and 20' can be made to be identical. FIG. 4 illustrates a case where a pair of polarization conversion devices 27 and 28 is disposed before and after the 4f relay system 20'.

As described above with reference to FIG. 3, each of the 4f relay systems 20 and 20' may include: a polarization beam splitter 21; a first wave plate 22 and a second wave plate 25 disposed to both sides of the polarization beam splitter 21; a first mirror 24 and a second mirror 26 disposed to the outsides of the first and second wave plates 22 and 25, respectively, with predetermined gaps from the respective wave plates; and a condensing lens 23 disposed between the first wave plate 22 and the first mirror 24 or between the second wave plate 25 and the second mirror 26.

As the first and second wave plates 22 and 25, quarter wave plates relative to the wavelength of an incident beam may be used. Also, when a separation-type optical system 40 in which only predetermined parts of optical system including the objective lens 70 move is included in the structure, a 1D driving mirror may be disposed as at least one of the first and second mirrors 24 and 26, for example, the second mirror 26. By doing so, when the separation-type optical system 70 moves, the position of the 1D driving mirror is adjusted so as to be in proportion to the moving distance, and the optical distance between the first focus adjustment optical system 55 and the objective lens 70 and the optical distance between the second focus adjustment optical system 56 and the objective lens 70 can be maintained without change. FIG. 4 illustrates an example in which a 1D driving mirror is disposed as the second mirror 26 and the condensing lens 23 is disposed between the first mirror 24 and the first wave plate 22.

Meanwhile, when a pair of the polarization conversion devices 27 and 28 is disposed before and after the 4f relay system 20', the P-polarized reference beam (Lref) is converted into an S-polarized beam when passing through the polarization conversion device 27. Accordingly, both of the signal beam (Ls) incident on the 4f relay system 20 and the reference beam (Lref) incident on the 4f relay system 20' become S-polarized beams. The S-polarized reference beam (Lref) incident on the 4f relay system 20' is converted into a P-polarized beam by the polarization conversion device 28, after passing through the 4f relay system 20'.

The S-polarized beam incident on the 4f relay system 20 and 20' is reflected by the polarization beam splitter 21, converted into a first circularly polarized beam in the first wave plate 21, passing through the condensing lens 23, and incident on the first mirror 24. When the first circularly polarized beam is reflected by the first mirror 24, the beam is converted into a second circularly polarized beam, and after passing through the condensing lens 23, is converted into a P-polarized beam by the first wave plate 21, and transmits the polarization beam splitter 21. This beam is converted again into a third circularly polarized beam (the same polarized beam as the first or second circularly polarized beam) when passing through the second wave plate 25, and after being reflected by the second mirror 26, the beam is converted into an orthogonal fourth circularly polarized beam. This fourth circularly polarized beam is converted again into an S-polarized beam when passing through the second wave plate 25, and is reflected by the polarization beam splitter 21.

On the 4f relay systems 20 and 20', an S-polarized beam is incident, and an S-polarized beam is emitted from the 4f relay systems 20 and 20'. The S-polarized reference beam (Lref) emitted from the 4f relay system 20' is converted into a P-polarized beam by the polarized beam conversion device 28.

Accordingly, an S-polarized signal beam (Ls) and a P-polarized reference beam (Lref) are incident on the fourth optical path changer 63.

In this case, without applying the pair of the polarization conversion devices 27 and 28, the polarization beam splitter 21 may be configured such that the polarization beam splitter 21 used for the 4f relay system 20 reflects an S-polarized beam and transmits a P-polarized beam, and the polarization beam splitter 21 used for the 4f relay system 20' transmits an S-polarized beam and reflects a P-polarized beam.

A holographic information recording and/or reproducing apparatus according to an embodiment of the present invention may have a structure in which only one focus adjustment optical system and one 4f system are disposed on the optical path of a signal beam (Ls) or a reference beam (Lref) without the two mirrors 53 and 54, the first and second half wave plates 57 and 59, and the second optical path changer 58. Also, a holographic information recording and/or reproducing apparatus according to an embodiment of the present invention may have a structure in which only one 4f system is disposed on the optical path of a signal beam (Ls) or a reference beam (Lref) without the focus adjustment optical system, the two mirrors 53 and 54, the first and second half wave plates 57 and 59, and the second optical path changer 58.

The optical paths of the linearly polarized signal beam (Ls) and reference beam (Lref) orthogonal to each other and passing through the first and second focus adjustment optical systems 55 and 56, and the 4f relay systems 20 and 20', respectively, are combined in the fourth optical path changer 63, and the optical path is bent by the reflection mirror 41, and proceeds to the objective lens 70. When a structure using the reflection mirror 41 is used, the separation-type optical system 40 basically includes the objective lens 70 and the reflection mirror 41, and can be configured so as to move between the inner circumference and outer circumference of the holographic information storage medium 300 relative to the optical system including the first light source 30 through the fourth optical path changer 63. As described above, when the separation-type optical system 40 moves, the 1D driving mirror of the 4f relay system 20 and 20' moves in accordance with this, and the optical distance between the first focus adjustment optical system 55 and the objective lens 70 and the optical distance between the second focus adjustment optical system 56 and the objective lens 70 can be maintained to be constant.

The objective lens 70 is a lens for condensing a signal beam (Ls) and a reference beam (Lref) that are beams for recording and/or reproducing information, in a predetermined area of the holographic information storage medium 300. As described above, the focal distance from the objective lens 70 with respect to the signal beam (Ls) and the reference beam (Lref) can be changed by the first and second focus adjustment optical systems 55 and 56. By making the focal distance of the reference beam (Lref) shorter than the focal distance of the signal beam (Ls), the reference beam (Lref) can be directly condensed on one focus (F) on the recording layer 360, illustrated in FIG. 6, and the signal beam (Ls) can be condensed on the focus (F) on the recording layer 360 after reflecting off the reflection layer 340 illustrated in FIG. 6. This optical design may vary with respect to specific positional relationships between optical devices, and specifications of the holographic information storage medium 300.

Meanwhile, when the reference beam (Lref) is focused directly on a recording location in the holographic information storage medium 300, while the signal beam (Ls) is reflected by the reflection layer of the holographic information storage medium 300, and then, focused on the recording position, the signal beam (Ls) responds more sensitively to tilt and the like of the holographic information storage medium 300 than the reference beam (Lref). Also, when the effective numerical aperture of the lens optical system is large, focused light is much influenced by the tilt and the like of the holographic information storage medium 300.

Accordingly, the lens optical system of the holographic information recording and/or reproducing apparatus according to the present invention can be constructed such that the effective numerical aperture of a lens optical system related to the signal beam (Ls) (for example, the first focus adjustment optical system 55 and the objective lens 70) is equal to or less than the effective numerical aperture of a lens optical system related to the reference beam (Lref) (for example, the second focus adjustment optical system 56 and the objective lens 70).

Meanwhile, the holographic information recording and/or reproducing apparatus according to the current embodiment of the present invention may further include a wave plate converting the polarization of an incident beam, for example, a quarter wave plate, between the optical path combining unit and the objective lens 70 and may further include a first photodetector 37 receiving a reproduction beam (Lr)

obtained by reproducing a hologram recorded in the holographic information storage medium 300. As illustrated in FIG. 4, the quarter wave plate 45 may be mounted on the separation-type optical system 40. Also, the quarter wave plate 45 may be disposed between the fourth optical path changer 63 and the separation-type optical system 40.

In a recording mode, the quarter wave plate 45 converts the P-polarized reference beam (Lref) and the S-polarized signal beam (Ls) incident from the optical path combining unit, into circularly polarized beams orthogonal to each other. Also, in a reproduction mode, the quarter wave plate 45 converts a P-polarized beam, which proceeds along the same optical path of the P-polarized reference beam (Lref) of the recording mode, and is incident through the optical path combining unit, into one circularly polarized beam. Since the beam which is emitted from the first light source 30 in a reproduction mode, and is incident on the quarter wave plate 45 passing through optical systems, travels the same optical path as that of the reference beam (Lref) of the recording mode, and can have a practically identical polarization state after passing through each optical device, to that of the reference beam (Lref), the beam emitted to the holographic storage medium for reproducing information will be expressed as a reference beam (Lref) hereinafter. In a reproduction mode, since the polarization conversion device 51 is turned off not to perform the function of a wave plate, the P-polarized reference beam (Lref) emitted from the first light source 30 passes through the polarization conversion device 51 without a polarization change, and is incident on the first optical path changer 52, and by traveling along the optical path of the reference beam (Lref) of the recording mode, is emitted to the holographic information storage medium 300. When the reference beam (Lref) is emitted to the holographic information storage medium 300 by the first light source 30, the reproduction beam (Lr) obtained by reproducing a hologram from this holographic information storage medium 300 proceeds along the return path illustrated in FIG. 4, and can be separated in the first optical path changer 52, thereby being received by the first photodetector 37. A detection lens 35 making the reproduction beam (Lr) condensed in an appropriate size into the first photodetector 37 may be further disposed between the first photodetector 37 and the first optical path changer 52.

In a reproduction mode, since the P-polarized reference beam (Lref) is incident on the quarter wave plate 45, the reproduction beam (Lr) reproduced from the holographic information storage medium 300 is incident to the optical path combining unit in an S-polarized state because of the presence of the quarter wave plate 45. This S-polarized reproduction beam (Lr) is reflected by the fourth optical path changer 63, passes through the 4f relay system 20' and is incident on the second half wave plate 59. In a reproduction mode, since the second half wave plate 59 is turned off not to perform the function of a wave plate, the S-polarized reproduction beam (Lr) is reflected by the second optical path changer 58, and also reflected by the first optical path changer 52, and is received by the first photodetector 37.

Figure 6:
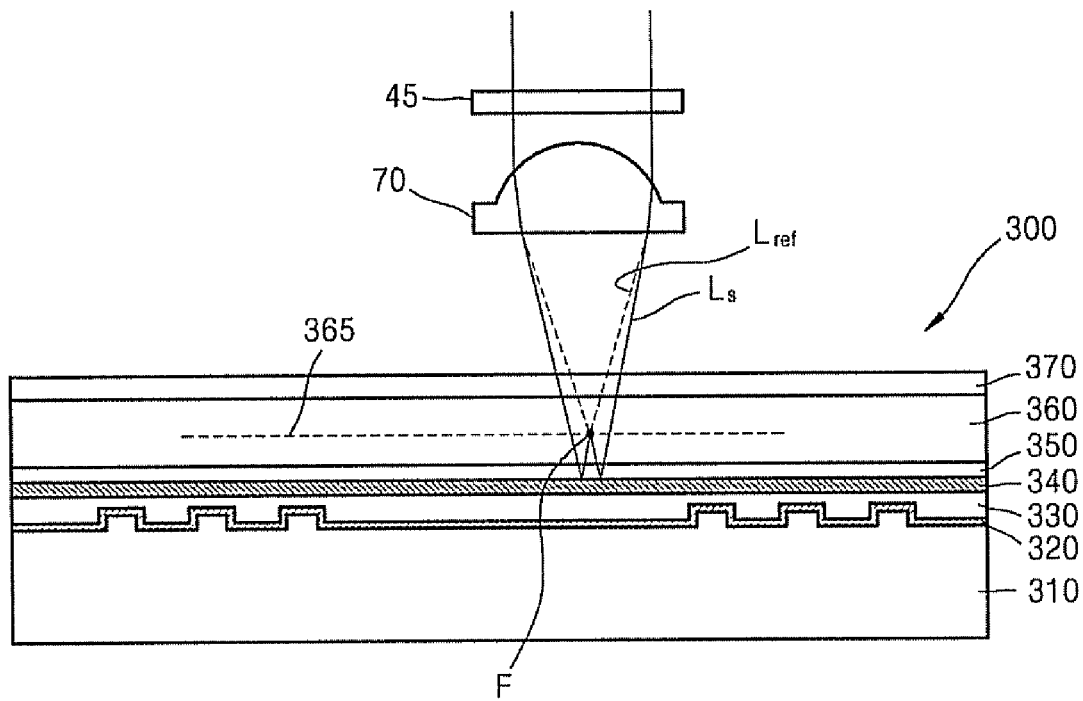
FIG. 6 is a schematic diagram illustrating optical paths of a signal beam and a reference beam along which the beams are emitted to the holographic information storage medium illustrated in FIG. 5 in a recording mode, according to an embodiment of the present invention.

Meanwhile, the holographic information recording and/or reproducing apparatus according to the current embodiment of the present invention may further include a servo optical system 200 as described above. As will be described later, the holographic information storage medium 300 used in the holographic information recording and/or reproducing apparatus according to the present invention can have a servo layer 320 as illustrated in FIG. 6. The servo optical system 200 is to read servo information recorded in the servo layer 320. The servo optical system 200 may also detect a servo error signal.

The servo optical system 200 may include a second light source 210, a fifth optical path changer 230, and a second photodetector 270. Also, the servo optical system 200 may further include a second collimating lens 240 and a third focus adjustment optical system 250.

The second light source 210 emits light to be used to implement a servo. As the second light source 210, a semiconductor LD emitting, for example, a red light beam having wavelength different from that of a beam emitted by the first light source 30 for recording and/or reproducing can be used.

The second light source 210 can be configured so as to emit one direction linearly polarized beam, for example, a P-polarized beam.

The fifth optical path changer 230 may include, for example, a polarization selective beam splitter designed to transmit a P-polarized beam and reflect an S-polarized beam, so that the beam incident from the second light source 210 and the beam including servo information reflected by the holographic information storage medium 300 can be separated according to the polarization direction.

The servo optical system 200 may further include a diffraction grating 220 between the second light source 210 and the fifth optical path changer 230. This diffraction grating 220 diffracts the beam emitted from the second light source 210 into a 0-th order diffraction beam or ±first order diffraction beam, thereby enabling tracking servo error signal detection using a 3-beam method or a differential push-pull method. The second collimating lens 240 collimates the beam emitted from the second light source 210 into a parallel beam.

The third focus adjustment optical system 250 varies the position of the focus of a servo beam in the holographic information storage medium 300 in the depth direction, and includes a plurality of lenses 251 and 255. At least one lens 251 may be installed movably in the optical axis direction, thereby being driven by a driving unit (not shown). A second detection lens 260 may be further included between the fifth optical path changer 230 and the second photodetector 270. This second detection lens 260 is to appropriately form an optical spot of a reflected beam including servo information on the second photodetector 270, and, for example, an astigmatism lens enabling error signal detection by an astigmatism method can be used as the second detection lens 260.

The second photodetector 270 includes a plurality of optical detection parts and is disposed to detect servo information included in the servo layer 320 illustrated in FIG. 6 of the holographic information storage medium 300 or a servo error signal. The servo optical system 200 described above is an example of an optical system for a case where a beam having a wavelength different from that of the recording and/or reproducing beam is used, and the present invention is not limited to this.

As described above, the holographic information recording and/or reproducing apparatus according to the embodiment of the present invention uses a single-side-incident method in which a signal beam (Ls) and a reference beam (Lref) are incident on the same surface of the holographic information storage medium 300. By applying the 4f relay system, the apparatus can implement a separation-type optical system, in which only some optical system, including the objective lens 70, is to be moved between the inner circumference and the outer circumference of the holographic information storage medium 300, and thus can achieve a fast access time.

FIG. 5 is a schematic diagram of an example of a holographic information storage medium 300 used in a holographic information recording and/or reproducing apparatus according to an embodiment of the present invention. The holographic information storage medium 300 illustrated in FIG. 5 is a reflection-type holographic information storage medium, which is disclosed in Korean Patent Application No. 10-2007-0081445 filed by the present applicant.

Referring to FIG. 5, the holographic information storage medium 300 may have a structure in which a substrate 310, a servo layer 320, a buffer layer 330, a reflection layer 340, a space layer 350, a recording layer 360, and a cover layer 370 are sequentially laminated. The servo layer 320 is a layer in which servo information is recorded, and reflects a servo beam. The buffer layer 330 may be formed of a transparent material, or a material which is transparent with respect to a wavelength of a servo beam and absorbent with respect to the wavelength of a beam for recording and/or reproducing. The reflection layer 340 reflects a signal beam (Ls). The signal beam (Ls) reflected by this reflection layer 340 is condensed on one focus (F) illustrated in FIG. 6 in the recording layer 360. The reflection layer 340 is designed so as to transmit a beam used for implementing a servo. In order to reduce noise the reflection layer 340 may be designed so as to transmit a reference beam (Lref) so that the reference beam (Lref) cannot act as noise source by avoiding a case where the reference beam (Lref) passing through a hologram recording position without change is reflected by this reflection layer 340, thereby returning to the hologram recording position again and acting as a noise. The space layer 350 is a layer to secure a space between the recording layer 360 and the reflection layer 340.

The recording layer 360 may be made of a photosensitive material whose refraction index changes when light is absorbed. For example, the recording layer 360 may be formed by a photopolymer or a thermoplastic material. The cover layer 370 is a layer to protect the recording layer 360 from exposure to the outside.

A method of recording and/or reproducing information of a holographic information recording and/or reproducing apparatus according to the embodiment of the present invention described above will now be explained with reference to FIGS. 6 through 8.

First, a recording mode of a holographic information recording and/or reproducing apparatus according to an embodiment of the present invention will be explained. FIG. 6 is a schematic diagram illustrating a signal beam and a reference beam emitted to the holographic information storage medium 300 illustrated in FIG. 5 in a recording mode according to an embodiment of the present invention.

Referring to FIG. 6, a signal beam (Ls) of S-polarization and a reference beam (Lref) of P-polarization that are orthogonal to each other pass through a quarter wave plate 45 and an objective lens 70 and are incident on an identical surface of the holographic information storage medium 300.

The signal beam (Ls) passes through the cover layer 370 and the recording layer 360, reflects off the reflection layer 340, and then, is condensed on one focus (F) in the recording layer 360. The reference beam (Lref) passes through the cover layer 370, and then, can be directly condensed on the focus (F) in the recording layer 360.

As the spot of the signal beam (Ls) and the spot of the reference beam (Lref) thus overlap on the focus (F), an interference pattern is formed. Since the shape of this interference pattern varies with respect to the modulation state of the signal beam (Ls), information can be recorded by the interference pattern. The interference pattern can be recorded along a track on an identical surface, thereby forming an information surface 365 of a single layer in the holographic recording layer 360. By adjusting the positions of the lenses 55a and 56a of the first and second focus adjustment optical systems 55 and 56 and superimposing interference patterns in the depth direction of the holographic recording layer 360 by varying the positions of the focuses of the signal beam (Ls) and the reference beam (Lref), information can be recorded in multiple layers. In the holographic information storage medium 300, information can be recorded in a microholographic method by which information of a single bit is included in an interference pattern at each focus (F). However, the present invention is not limited to this. For example, information can also be recorded in a volume holographic method by which multiple information items can be recorded in an interference pattern in a 3D manner by superimposing the spot of the signal beam (Ls) and the spot of the reference beam (Lref) on the focus (F).

Figure 7:
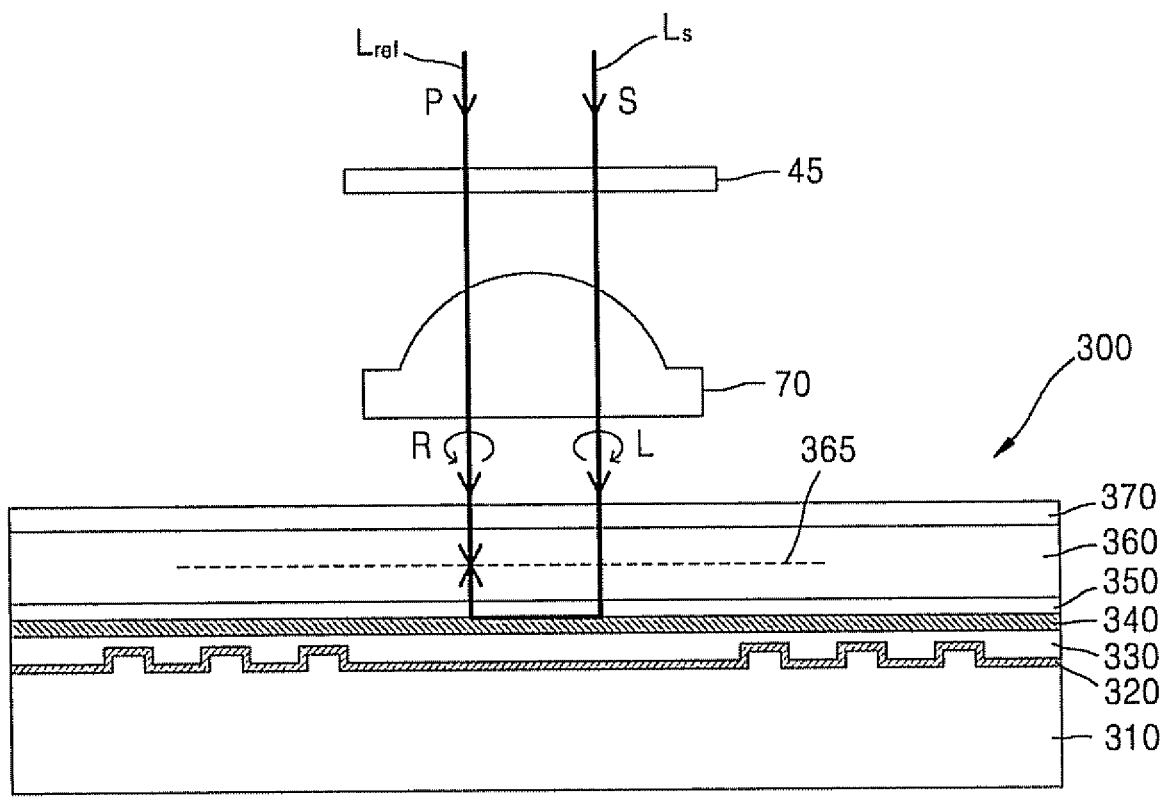
FIG. 7 is a diagram illustrating an example of polarization states of a signal beam (Ls) and a reference beam (Lref) incident on a holographic information storage medium according to an embodiment of the present invention.

FIG. 7 is a diagram illustrating an example of polarization states of a signal beam (Ls) and a reference beam (Lref) incident on a holographic information storage medium 300 in a recording mode according to an embodiment of the present invention. Referring to FIG. 7, the signal beam (Ls) and the reference beam (Lref) having different polarizations are incident on a quarter wave plate 45. For example, the signal beam (Ls) may have an S-polarized state, and the reference beam (Lref) may have a P-polarized state. When passing through the quarter wave plate 45, the polarization state of the signal beam (Ls) is converted into, for example, a left circular polarization state (L), and the polarization state of the reference beam (Lref) is converted into a right circular polarization state (R). The signal beam (Ls) having the left circular polarization state (L) is reflected directly by the reflection layer 340, and maintains the left circular polarization state (L). The reflected signal beam (Ls) of the left circular polarization state (L) is focused on an information surface 365. Meanwhile, the reference beam (Lref) having the right circular polarization state (R) passes through the cover layer 370, and then, is directly focused on the information surface 365. Since the signal beam (Ls) and the reference beam (Lref) meeting on the information surface 365 proceed in opposite directions and have circular polarized states opposite to each other, the electric field vectors of the signal beam (Ls) and the reference beam (Lref) rotate in an identical direction, thereby causing an interference on the recording layer 365. Thus information is recorded on the holographic recording layer 360 made of a photosensitive material.

Meanwhile, the signal beam (Ls) reflected by the reflection layer 340 proceeds to the outside of the holographic information storage medium 300 through the cover layer 370 after forming the interference pattern on the focus (F).

Since the reflected signal beam (Ls) maintains the left circular polarization state (L), the signal beam (Ls) is converted into an S-polarized beam when passing through the quarter wave plate 45.

Thus, the reflected S-polarized signal beam (Ls) is reflected by the fourth optical path changer 63, passes through the 4f relay system 20, and then passes through the second half wave plate 59. Since the second half wave plate 59 runs in the recording mode, the second half wave plate 59 converts the polarization of the reflected signal beam (Ls). As described above, if an S-polarized beam is incident on the second half wave plate 59 in the recording mode, the second half wave plate 59 converts most of the S-polarized component into a P-polarized component, but leaves some of the S-polarized component without change. The reflected signal beam (Ls) having this part of the S-polarized component is reflected by the second optical path changer 58, and proceeds back along the optical path of the reference beam (Lref). That is, the S-polarized signal beam (Ls) reflected by the second optical path changer 58 is incident on the first optical path changer 52 through the second mirror 54 and the second focus adjustment optical system 56. The incident S-polarized signal beam (Ls) is reflected by the first optical path changer 52, and arrives at the first photodetector 37.

The information of the reflected signal beam (Ls) detected in the first photodetector 37 can be used in order to control the first and/or second focus adjustment optical systems 55 and 56. Also, the information can be used for focus servo in order to make the reference beam (Lref) and the signal beam (Ls) focused on a predetermined information layer 365 in the holographic information storage medium 300.

Next, referring to FIG. 8, a reproduction mode of a holographic information recording and/or reproducing apparatus according to an embodiment of the present invention will now be explained. FIG. 8 is a diagram illustrating an example of an optical path and polarization state of a light beam incident on a holographic information storage medium 300 in a reproduction mode according to an embodiment of the present invention.

Figure 8:
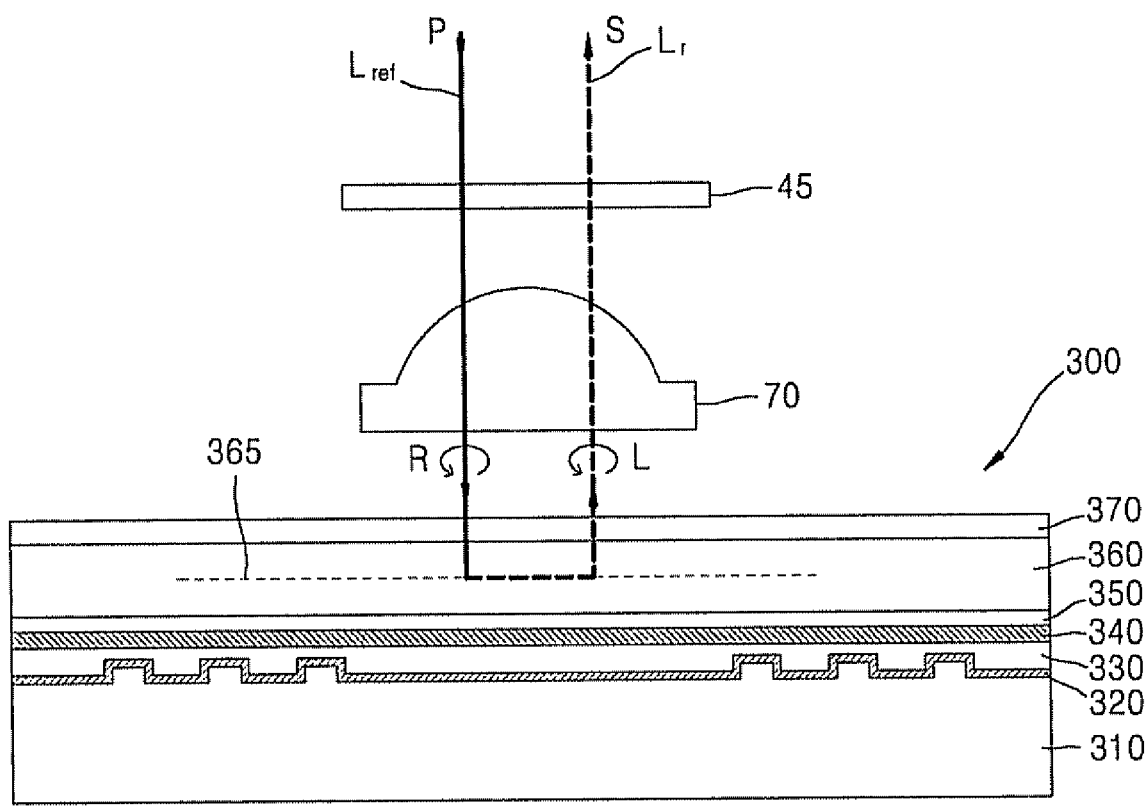
FIG. 8 is a diagram illustrating an example of an optical path and polarization state of a light beam incident on a holographic information storage medium in a reproduction mode, according to an embodiment of the present invention.

Referring to FIG. 8, a reference beam (Lref) is emitted on the holographic information storage medium 300 in order to reproduce information. The reference beam (Lref) passes through a quarter wave plate 45 and an objective lens 70, and is focused directly on an information surface 365 in which information is recorded in a recording layer 360. Meanwhile, the P-polarized reference beam (Lref) is converted into a right circularly polarized state (R) through the quarter wave plate 45, and is incident on the holographic information storage medium 300 through the objective lens 70. The reference beam (Lref) incident in the right circularly polarized state (R) is diffracted, that is, reflected, by the information surface 365 on which information is recorded by an interference pattern, thereby being directed again to the objective lens 70. Since only the proceeding direction of the reproduction beam (Lr) reflected by the information surface 365 is changed, and the rotation direction of the electric field vector of the reproduction beam (Lr) is not changed, the reproduction beam (Lr) is in a left circularly polarized state (L). The reproduction beam (Lr) having the left circularly polarized state (L) is again converted in an S-polarized beam when passing through the quarter wave plate 45, and travels the reverse path of the optical path of the signal beam (Ls) in the recording mode. Since the second half wave plate 59 does not perform the function of a wave plate as illustrated in FIG. 4, the reproduction beam (Lr) is reflected by the second optical path changer 58, and reflected by the first optical path changer 52, and detected in the first photodetector 37.

Next, referring to FIG. 9, detection of servo information in a holographic information recording and/or reproducing apparatus according to an embodiment of the present invention will now be explained.

Figure 9:
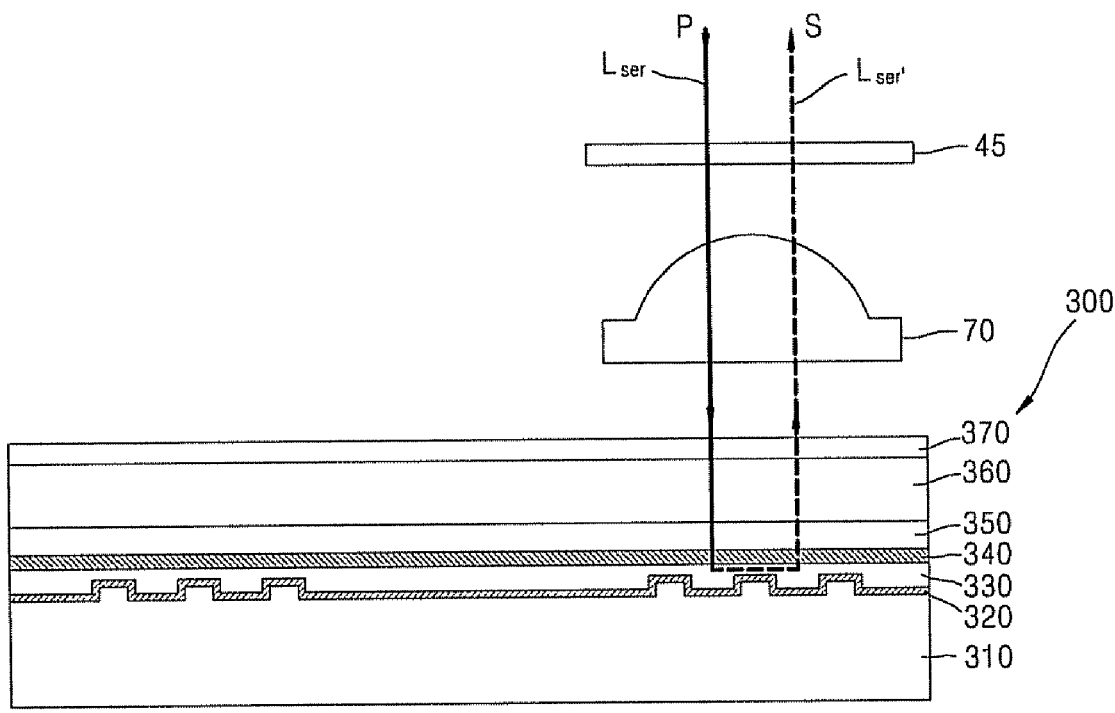
FIG. 9 is a diagram illustrating an example of an optical path and polarization state of a light beam incident on a holographic information storage medium in order to detect a servo, according to an embodiment of the present invention.

Referring to FIG. 9, a linearly polarized beam in one direction, for example, a beam (Lser) used for implementing a servo of P polarization, is incident on a holographic information storage medium 300 through a quarter wave plate 45 and an objective lens 70. The beam (Lser) is converted into, for example, a right circularly polarized beam when passing through the quarter wave plate 45. The beam (Lser) incident on the holographic information storage medium 300 is reflected by a servo layer 320, thereby becoming a servo beam (Lser') having servo information. In this case, since the rotation direction of the polarization vector of the servo beam (Lser') does not change but the proceeding direction is reversed, the right circularly polarized beam becomes a left circularly polarized beam. The reflected servo beam (Lser') is again converted into an S-polarized beam through the quarter wave plate 45, and is incident on the fourth optical path changer 63. Then, the servo beam (Lser') passes sequentially through the fourth optical path changer 63, the 4f relay system 20', and the third optical path changer 61, and is reflected by the fifth optical path changer 230 of the servo optical system 200, and detected by the second photodetector 270.

Figure 10:
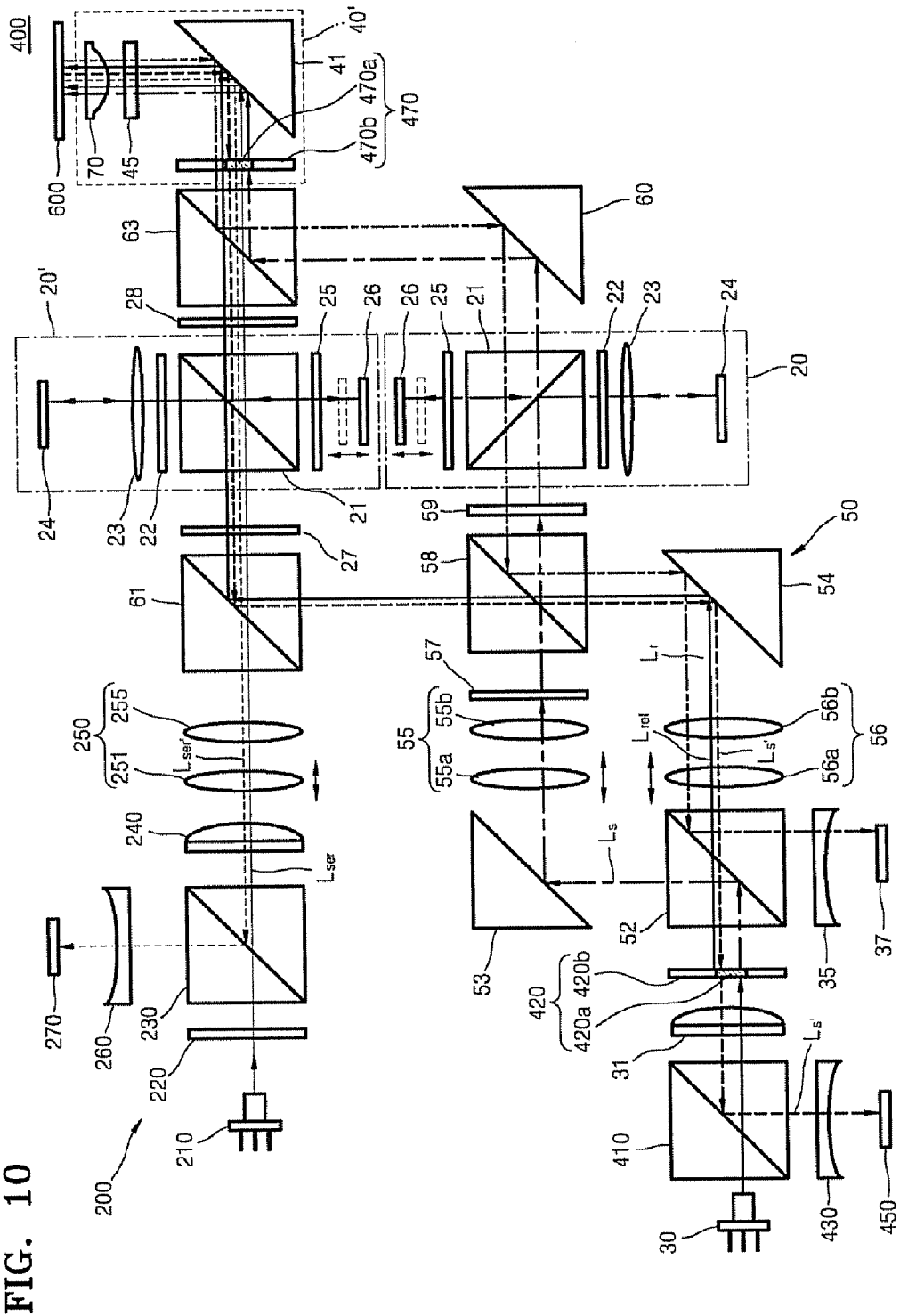
FIG. 10 is a schematic diagram illustrating an optical structure of a holographic information recording and/or reproducing apparatus according to another embodiment of the present invention.

FIG. 10 is a schematic diagram illustrating an optical structure of a holographic information recording and/or reproducing apparatus according to another embodiment of the present invention. When compared with the holographic information recording and/or reproducing apparatus 100 illustrated in FIG. 4, the holographic information recording and/or reproducing apparatus 400 illustrated in FIG. 10 is more appropriate to a holographic information storage medium 600 having a reflection layer made of an ordinary reflection film material, and includes a first polarization conversion device 420 instead of the polarization conversion device 51, and further includes a second polarization conversion device 470 on the optical path between an optical path forming optical system 50 and a quarter wave plate 45. Also, the holographic information recording and/or reproducing apparatus 400 according to another embodiment of the present invention may further include a sixth optical path changer 410 and a third photodetector 450 in order to detect a signal beam (Ls) that is reflected by the holographic information storage medium and returns back toward the sixth optical path changer 410. A third detection lens 430 may be further included between the sixth optical path changer 410 and the third photodetector 450. The sixth optical path changer 410 may be disposed between a first light source 30 and a first collimating lens 31. One circularly polarized beam incident on a reflection layer made of an ordinary reflection film material becomes the other orthogonal circularly polarized beam when reflected by the reflection layer. Only when a signal beam (Ls) and a reference beam (Lref) proceed in the opposite directions facing each other and have the opposite directions of the circular polarizations, the electric field vectors of the signal beam (Ls) and the reference beam (Lref) rotate in the same direction, thereby causing interference and recording a hologram in a recording layer of the holographic information storage medium 600.

Accordingly, when a reflection layer made of an ordinary reflection film material is used, the signal beam (Ls) and the reference beam (Lref) incident through an identical surface of the holographic information storage medium 600 should have an identical circularly polarized state. In order to implement this condition, the first and second polarization conversion devices 420 and 470 are configured accordingly.

Among optical devices of the current embodiment, those optical devices which are practically the same as the optical devices of the holographic information recording and/or reproducing apparatus described above with reference to FIG. 4 will be indicated by identical reference numbers and the explanation will be omitted here.

The sixth optical path changer 410 can include, for example, a polarization beam splitter, in order to transmit a one linearly polarized beam emitted from the first light source 30, and reflect an orthogonal polarized beam. As will be explained later, in a recording mode, the polarization when the signal beam (Ls) reflected by holographic information storage medium 600 is incident on the sixth optical path changer 450, is orthogonal to the polarization of the beam emitted from the first light source 30, and therefore the reflected signal beam (Ls) is reflected toward the third photodetector 450. For example, if the first light source 30 emits a P-polarized beam for recording and/or reproducing, when the signal beam (Ls) reflected by the holographic information storage medium 600 is incident on the sixth optical path changer 450, the signal beam (Ls) has an S-polarization state, and therefore is reflected by the sixth optical path changer 410, and is directed to the third photodetector 450.

The first polarization conversion device 420 may include a first polarization conversion area 420a in the central part and a first transparent area 420b surrounding the central part. The first polarization conversion area 420a is configured to perform the function of an active wave plate. In a recording mode, the first polarization conversion area 420a converts a P-polarized beam into an S-polarized beam and an S-polarized beam into a P-polarized beam, and in a reproduction mode, transmits the P-polarized beam emitted from the first light source 30 without polarization change. Irrespective of the recording mode or reproduction mode, the first transparent area 420a transmits the P-polarized beam emitted from the first light source 30 without polarization change.

Accordingly, when passing through the first polarization conversion device 420, the beam emitted by the first light source 30 for recording and/or reproducing is spatially divided into the signal beam (Ls) converted into the S-polarized beam through the first polarization conversion area 420a and the reference beam (Lref) passing through the first transparent area 420b without polarization change.

The current embodiment is illustrated and explained with an example of the structure in which the first polarization conversion area 420a is disposed at the central part and the first transparent area 420b is disposed surrounding the central part, but the present invention is not limited to this. That is, a structure in which the first polarization conversion area 420a is disposed in the surrounding area of the first polarization conversion device 420 and the first transparent area 420b is disposed at the central part is also possible.

The optical paths of the S-polarized signal beam (Ls) and the P-polarized reference beam (Lref) passing through the first polarization conversion area 420a and the first transparent area 420b, respectively, of the first polarization conversion device 420 are divided and combined according to the polarization when the beams passing through an optical path forming optical system 50. Except that the S-polarized signal beam (Ls) and the P-polarized reference beam (Lref) are separated spatially relative to an optical axis, the configurations of an optical path forming optical system, a first and second focus adjustment optical system 55 and 56, and 4f relay systems 20 and 20' and the traveling path in these configurations are the same as the embodiment of the present invention described above with reference to FIG. 4. Accordingly, the explanation of the processes of the signal beam (Ls) and the P-polarized reference beam (Lref) traveling in the optical path forming system 50, the first and second focus adjustment optical systems 55 and 56, and the 4f relay systems 20 and 20' will be omitted here.

The second polarization conversion device 470 may be disposed between the fourth optical path changer 63 and the reflection mirror 41. The second polarization conversion device 470 may be constructed corresponding to the first polarization conversion device 420. That is, the second polarization conversion device 470 may be divided into a second polarization conversion area 470a in the central part and a second transparent area 470b surrounding the central part. The second polarization conversion area 470a is configured to perform the function of an active wave plate. In a recording mode, the second polarization conversion area 470a converts a P-polarized beam into an S-polarized beam and an S-polarized beam into a P-polarized beam, and in a reproduction mode, transmits a passing beam without polarization change. Irrespective of the recording mode or reproduction mode, the second transparent area 470a transmits a passing beam without polarization change. Since the signal beam (Ls) passing through the central part of the light flux or the reference beam (Lref) passing through the part surrounding the central part maintain the spatial distribution even though passing through the optical path forming optical system, the signal beam (Ls) passes through the second polarization conversion area 470a and the reference beam (Lref) passes through the second transparent area 470B. Accordingly, the signal beam (Ls) passing through the second polarization conversion area 470a is polarization-converted, while the reference beam (Lref) passing through the second transparent area 470b is not polarization-converted.

The current embodiment is explained with an example of the structure in which the second polarization conversion area 470a is disposed at the central part and the second transparent area 470b is disposed surrounding the central part, corresponding to the structure of the first polarization conversion device 420. However, the present invention is not limited to this and a structure in which the locations of the second polarization conversion area 470a and the second transparent area 470b may be swapped is within the scope of the present invention.

In the current embodiment, the reference beam (Lref) and the signal beam (Ls) being divided into the surrounding light flux and the central flux are emitted to the holographic information storage medium 600.

In a reproduction mode, the first and second polarization conversion areas 420a and 470a of the first and second polarization conversion devices 420 and 470 are turned off and an incident beam is transmitted without polarization change.

Accordingly, in addition to the beam passing through the first and second transparent areas 420a and 470b, the beam passing through the first and second polarization conversion areas 420a and 470b is also used for reproducing information.

In the current embodiment, in a recording mode, the reference beam (Lref) and the signal beam (Ls) being divided into the surrounding light flux and the central light flux proceed to the holographic information storage medium 600 and have identical polarization states between the second polarization conversion device 470 and the holographic information storage medium 600. Except this, the optical paths in which the signal beam (Ls) and the reference beam (Lref) in the recording mode and in the reproduction mode travel and the changes in the polarization states are the same as the embodiment of the present invention described above with reference to FIG. 4. However, since the signal beam (Ls) reflected by the holographic information storage medium 600 in a recording mode does not pass through the second half wave plate 59 when returning to the third photodetector 450, the second half wave plate 59 may be disposed so that the optical axis of the second half wave plate 59 can match with the polarization direction of an incident beam so as to polarization-convert all S-polarized signal beam (Ls) incident on the second half wave plate 59 into a P-polarized signal beam (Ls).

Figure 11:
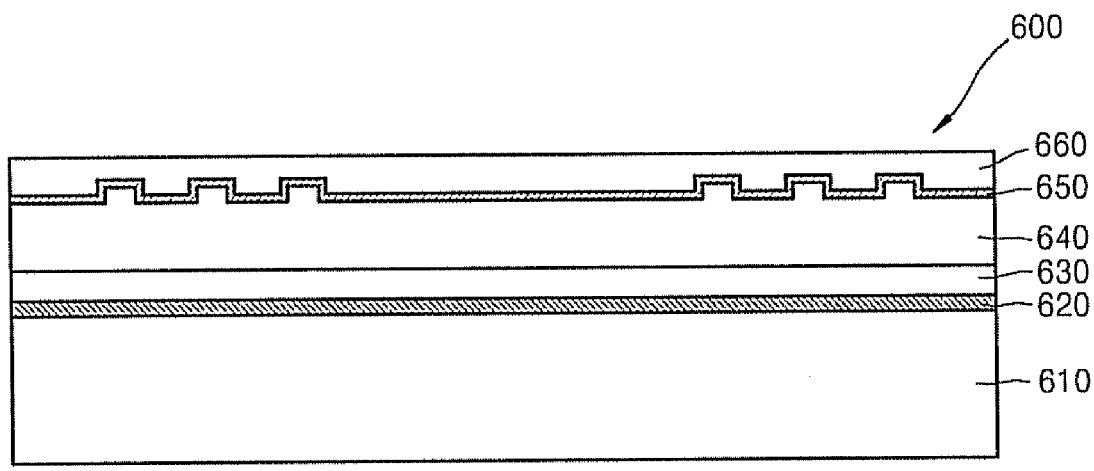
FIG. 11 is a diagram illustrating a reflection-type holographic information storage medium used in the holographic information recording and/or reproducing apparatus illustrated in FIG. 10, according to an embodiment of the present invention.

The third photodetector 450 is a device for detecting a signal beam (Ls) reflected by the holographic information storage medium 600. The third detection lens 430 disposed between the sixth optical path changer 410 and the third photodetector 450 makes an optical spot of the reflected signal beam (Ls) appropriately formed in the third photodetector 450. FIG. 11 is a diagram illustrating a reflection-type holographic information storage medium 600 used in the holographic information recording and/or reproducing apparatus 400 illustrated in FIG. 10 according to an embodiment of the present invention.

Referring to FIG. 11, the holographic information storage medium 600 used in the holographic information recording and/or reproducing apparatus 400 according to the current embodiment is a reflection-type storage medium, and may have a structure in which a substrate 610, a reflection layer 620, a space layer 630, a recording layer 640, a servo layer 650, and a cover layer 660 are sequentially laminated.

In the holographic information storage medium according to the current embodiment, the reflection layer 620 has a different characteristic from that of the holographic information storage medium 300 explained above with reference to FIG. 5, and the position of the servo layer 650 is different.

The position of the servo layer 650 as described above with reference to FIG. 5 is not limited to that above the reflection layer 620 and can be disposed at another position.

In the current embodiment, the reflection layer 620 is made of an ordinary reflection film material, and unlike the reflection layer 340 of the holographic information storage medium 300 described above with reference to FIG. 5, when a beam incident as a circularly polarized beam is reflected, the direction of the circular polarization is changed. The resulting polarization state of the beam when recording and/or reproducing will now be explained with reference to FIGS. 12 and 13.

Figure 12:
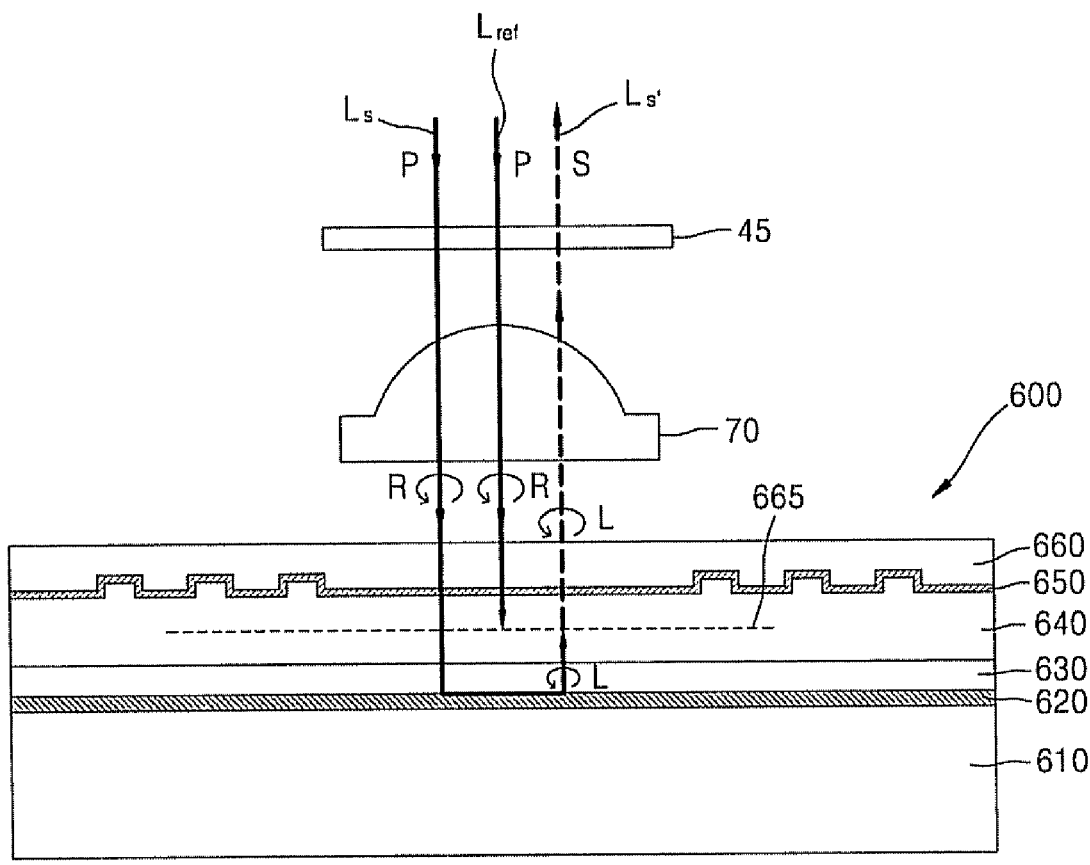
FIG. 12 is a diagram illustrating polarization states of a signal beam and a reference beam emitted to the holographic information storage medium illustrated in FIG. 10 in a recording mode, according to an embodiment of the present invention.

Referring to FIG. 12, the reference beam (Lref) and the signal beam (Ls) having identical linear polarization states are incident on a quarter wave plate 45.

For example, the reference beam (Lref) and the signal beam (Ls) in P-polarized states are incident on the quarter wave plate 45. When the reference beam (Lref) and the signal beam (Ls) pass through the quarter wave plate 45, the polarized states are converted into, for example, right circularly polarized states (R).

When the signal beam (Ls) having the right circularly polarized state is reflected by the reflection layer 620, the polarization state of the signal beam (Ls) is converted into a left circularly polarized state (L). The reflected signal beam (Ls) of the left circularly polarized state is focused on an information surface 665. Meanwhile, the reference beam (Lref) of the right circularly polarized state passes through the cover layer 660, and then, is directly focused on the information surface 665. Since the signal beam (Ls) and the reference beam (Lref) meeting on the information surface 665 proceed in opposite directions and have circular polarized states opposite to each other, the electric field vectors of the signal beam (Ls) and the reference beam (Lref) rotate in an identical direction, thereby causing an interference on the recording layer 665. This interference makes information recorded on the holographic recording layer 640 made of a photosensitive material.

Meanwhile, the signal beam (Ls) reflected by the reflection layer 620 proceeds to the outside of the holographic information storage medium 600 through the cover layer 660 after forming the interference pattern on the focus (F). The reflected signal beam proceeding to the outside the holographic information storage medium will be indicated by Ls'. Since the reflected signal beam (Ls') maintains the left circular polarization state (L), the signal beam (Ls') is converted into an S-polarized beam when passing through the quarter wave plate 45.

Thus, the reflected S-polarized signal beam (Ls') passes through the second polarization conversion device 470. The signal beam (Ls') positioned at the central part of the light flux passes through the second polarization conversion area 470a of the second polarization conversion device 470, and is converted into a P-polarized beam. Accordingly, the reflected signal beam (Ls') passes through the fourth optical path changer 63 without change and proceeds back to along the optical path of the reference beam (Lref). That is, the reflected signal beam (Ls') passes through the second polarization conversion area 470a of the second polarization conversion device 470, the fourth optical path changer 63, the wavelength-selective third optical path changer 61, the second optical path changer 58, the second mirror 54, the second focus adjustment optical system 56, and the first optical path changer 52, and then, is incident on the first polarization conversion area 420a of the first polarization conversion device 420. The reflected signal beam (Ls') is converted into an S-polarized beam when passing through the first polarization conversion area 420a, and is incident on the sixth optical path changer 410 through the first collimating lens 31. In this case, the reflected signal beam (Ls') is polarization-converted once more in the first polarization conversion area 420a into an S-polarized beam. Accordingly, the signal beam (Ls') is reflected by the sixth optical path changer 410 and is directed to the third photodetector 450.

Thus, in the recording mode, the information of the reflected signal beam (Ls') detected in the third photodetector 450 can be used in order to control the first and/or second focus adjustment optical systems 55 and 56, or can be used for focus servo in order to make the reference beam (Lref) and the signal beam (Ls) focused on a predetermined information surface 665 in the holographic information storage medium 300.

Figure 13:
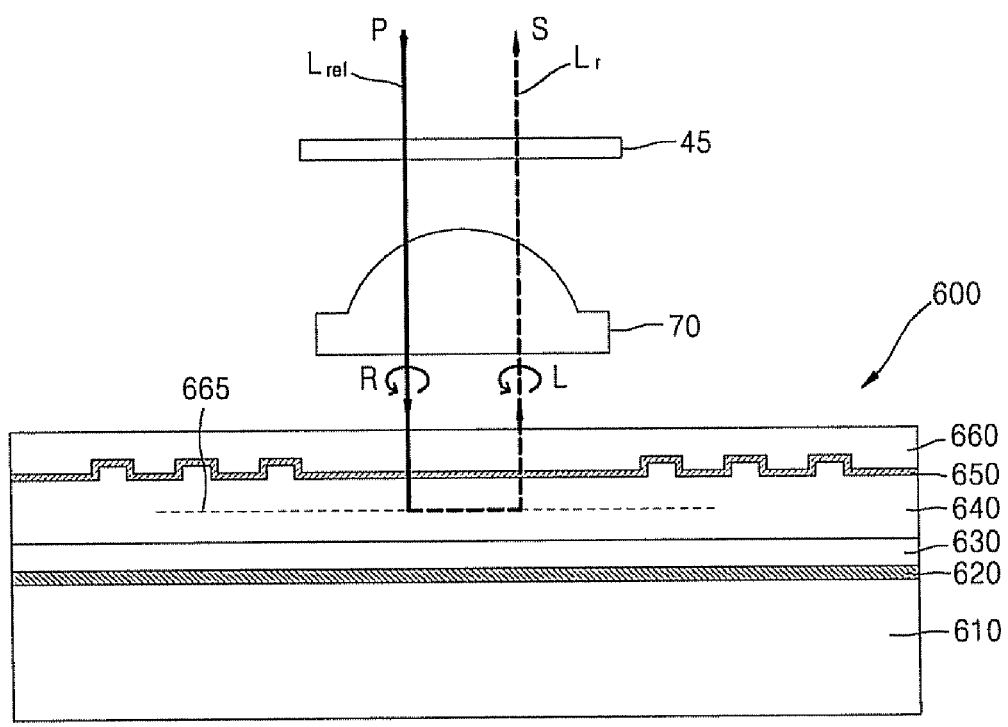
FIG. 13 is a diagram illustrating polarization states of a reproduction beam emitted by the holographic information recording and/or reproducing apparatus illustrated in FIG. 7 to the holographic information storage medium illustrated in FIG. 11 in a reproduction mode, according to an embodiment of the present invention.

Next, referring to FIG. 13, a reproduction mode of a holographic information recording and/or reproducing apparatus 400 according to another embodiment of the present invention will now be explained. FIG. 13 is a diagram illustrating polarization states of a beam incident on the holographic information storage medium 600 illustrated in FIG. 11 in a reproduction mode according to an embodiment of the present invention.

Referring to FIG. 13, a reference beam (Lref) is emitted on the holographic information storage medium 600 in order to reproduce information. In this case, the second half wave plate 59 does not perform a polarization conversion function and the first and second polarization conversion areas 420a and 470a of the first and second polarization conversion devices 420 and 470 do not perform the polarization conversion function. Accordingly, the reference beam (Lref) used for reproduction is a beam which passes through the first polarization conversion area 420a of the first polarization conversion device 420 and the first transparent area 420b and through the second polarization conversion area 470a of the second polarization conversion device 470 and the second transparent area 470b without polarization change, and has a P-polarized state. The P-polarized reference beam (Lref) is converted into, for example, a right circularly polarized state (R), through the quarter wave plate 45, and is incident on the holographic information storage medium 600 through the objective lens 70. The reference beam (Lref) focused on the information surface 665 is reflected with having information on an interference pattern formed on the information surface 665. That is, as the reference beam (Lref) incident in the right circularly polarized state is diffracted, i.e., reflected by the information surface 665 in which information is recorded by an interference pattern, a reproduction beam (Lr) is generated, and is directed to the objective lens 70. Since only the proceeding direction of the reproduction beam (Lr) reflected by the information surface 665 is changed, and the rotation direction of the electric field vector of the reproduction beam (Lr) is not changed, the reproduction beam (Lr) is in a left circularly polarized state (L). The reproduction beam (Lr) having the left circularly polarized state (L) is converted into an S-polarized beam when passing through the quarter wave plate 45. The S-polarized reproduction beam (Lr) is reflected by the fourth optical path changer 63, and through the mirror

60, the 4f relay system 20, and the second half wave plate 59, is incident on the second optical path changer 58.

The S-polarized reproduction beam (Lr) is reflected by the second optical path changer 58, and through the second mirror 54, and the second focus adjustment optical system, is incident on the first optical path changer 52. Thus, the reproduction beam (Lr) reflected by the holographic information storage medium 600 is reflected by the first optical path changer 52 and is detected in the first photodetector 37.

Meanwhile, a process of obtaining a servo detection signal by using a servo beam (Lser) incident on the holographic information storage medium 600 from the servo optical system 200 of the holographic information recording and/or reproducing apparatus 400 illustrated in FIG. 10 is similar to that described above with reference to FIG. 9, and therefore the explanation will be omitted here.

Although the embodiments of the holographic information recording and/or reproducing apparatus are explained with an example in which in a recording mode the reference beam and the signal beam passing through the polarization conversion devices 51 and 420 have a P-polarized state and S-polarized state, respectively, the present is not limited to this. Optical systems may be modified appropriately to fit a case in which the reference beam and the signal beam passing through the polarization conversion devices 51 and 420 in a recording mode have an S-polarized state and P-polarized state, respectively. Also, in the embodiments described above, an example of the holographic information recording and/or reproducing apparatus capable of both recording and reproducing is explained, but the present invention can also be applied to a recording-dedicated apparatus or a reproduction-dedicated apparatus. Furthermore, in the embodiments described above, an example in which the wavelength of a servo beam is different from that of a beam for recording and/or reproducing is explained. However, the present invention is not limited to this, and can be applied to a case where servo information and a servo error signal are extracted by using the recording and/or reproducing beam.

According to the present invention, the holographic information recording and/or reproducing apparatus uses a single-side-incidence method in which a signal beam and a reference beam are incident on an identical surface, and can implement a separation-type optical system, and therefore can implement a fast access time.

While the holographic information recording and/or reproducing apparatus according to the present invention and a holographic information storage medium therefor have been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, a holographic information recording and/or reproducing apparatus according to the current embodiment can be optically structured so that the S-polarized beam reflected from the first optical path changer 52 can be used as a reference beam (Lref) and the P-polarized beam passing through the first optical path changer 52 can be used as a signal beam (Ls). Also, the first optical path changer 52 may be formed to reflect the P-polarized beam and transmit the S-polarized beam, and according to this, the rest of the optical structure may be configured. Additionally, a structure in which the first polarization conversion area 420*a* is disposed in the surrounding area of the first polarization conversion device 420 and the first transparent area 420*b* is disposed at the central part is also possible. Yet further, locations of the second polarization conversion area 470*a* and the second transparent area 470*b* may be swapped. Accordingly, it is intended, therefore, that the present invention not be limited to the various example embodiments disclosed, but that the present invention includes all embodiments falling within the scope of the appended claims.

What is claimed is:

1. A holographic information recording and/or reproducing apparatus for use with a holographic information storage medium, the apparatus comprising:
   a light source to emit light;
   a first polarization conversion device to form, during a recording mode, a signal beam and a reference beam that are orthogonal polarization to each other from the light emitted from the light source;
   an optical path forming optical system to separate optical paths of the signal beam and the reference beam so that the signal beam and the reference beam proceed along respective paths, and then, to combine the optical paths thereof;
   a focus adjustment optical system disposed on an optical path of at least one of the signal beam and the reference beam in the optical path forming optical system, and to vary the position of a focus of at least one of the signal beam and the reference beam in a depth direction of the holographic information storage medium;
   an objective lens to focus the signal beam and the reference beam within the holographic information storage medium, to thereby form an interference pattern thereof and to record information in the form of the interference pattern on the holographic information storage medium; and
   a 4f relay system disposed on an optical path between the focus adjustment optical system and the objective lens to maintain a predetermined optical distance between the focus adjustment optical system and the objective lens.

2. The apparatus of claim 1, wherein the focus adjustment optical system comprises a first focus adjustment optical system and a second focus adjustment optical system disposed on the optical paths of the signal beam and the reference beam, respectively, in which the signal beam and the reference beam proceed independently, and
   wherein the 4f relay system is disposed on each of the optical path between the first focus adjustment optical system and the objective lens in which the signal beam proceeds, and the optical path between the second focus adjustment optical system and the objective lens in which the reference beam proceeds.

3. The apparatus of claim 2, wherein the 4f relay system comprises:
   a polarization beam splitter;

a first wave plate and a second wave plate disposed at both sides of the polarization beam splitter;
a first mirror and a second mirror disposed at the outside of the first and second wave plates with predetermined gaps; and
a condensing lens disposed between the first wave plate and the first mirror, or between the second wave plate and the second mirror.

4. The apparatus of claim 3, further comprising an optical pickup including:
the light source that is fixed in the optical pickup, and a separation optical system that is movably attached to the optical pickup, the separation optical system including the objective lens,
wherein a position of one of the first and second mirrors is adjusted according to a movement of the separation optical system.

5. The apparatus of claim 3, wherein at least one of the first mirror and the second mirror of the 4f relay system is arranged to move correspondingly with a movement of the objective lens to maintain the predetermined optical distance between the focus adjustment optical system and the objective lens.

6. The apparatus of claim 1, wherein:
the holographic information storage medium comprises a recording layer and a reflection layer,
the reference beam and the signal beam are emitted through a single-side surface of the holographic information storage medium,
the signal beam passes through the recording layer, is reflected by the reflection layer, and then, is condensed in the recording layer, and
the reference beam is directly condensed in the recording layer of the holographic information storage medium.

7. The apparatus of claim 6, wherein the first polarization conversion device is an active polarization conversion device which, during the recording mode, converts the polarization of a beam of light emitted from the light source to include two polarized beams that are orthogonal to each other, and during a reproduction mode, transmits the beam of light emitted from the light source without changing the polarization thereof.

8. The apparatus of claim 7, wherein the optical path forming optical system comprises:
a first optical path changer to separate a beam that is incident thereon from the first polarization conversion device into a first beam and a second beam according to the polarization of the incident beam;
a second optical path changer disposed at a location where the first and second beams separated by the first optical path changer intersect, and to separate a beam that is incident thereon according to the polarization of the incident beam;
a first mirror and a second mirror to change the optical paths of the first beam and the second beam, respectively, that are separated by the first optical path changer so that the first and second beams can be incident on the second optical path changer while intersecting each other;
a first and second half wave plates disposed on one of the optical paths of the first and second beams, and to the sides of the second optical path changer, so that the first and second beams pass through the second optical path changer in identical polarization states; and
an optical path combining unit to combine the optical paths of the first and second beams that pass through the second optical path changer,
wherein one of the first and second beams is the signal beam and the other is the reference beam.

9. The apparatus of claim 8, wherein the optical path combining unit comprises:
a third optical path changer to unconditionally reflect a beam incident from the second optical path changer;
a third mirror to change the optical path of one of the first and second beams, the one beam being not directed to the third optical path changer from the second optical path changer; and
a fourth optical path changer to combine the optical paths of the first and second beams having different polarizations that are intersectingly incident on the fourth optical path changer due to the third optical path changer and the third mirror, respectively.

10. The apparatus of claim 8, wherein the first or second half wave plates on which the first or second beam incident on the second optical path changer from the first optical path changer meets after passing through the second optical path changer, is an active wave plate which, during the recording mode, operates to convert polarization of a beam that is incident thereto, and during the reproduction mode, operates to transmit a beam that is incident thereto without polarization change.

11. The apparatus of claim 8, wherein the reflection layer of the holographic information storage medium reflects a beam that is incident on the holographic information storage medium without a polarization change.

12. The apparatus of claim 11, wherein the first polarization conversion device is an active wave plate which converts a beam that is incident thereto into a polarized signal beam and a polarized reference beam that are orthogonal to each other only in the recording mode,
a quarter wave plate is further included between the objective lens and the optical path forming optical system, and
the signal beam and the reference beam proceeding from the optical path forming optical system to the quarter wave plate have linear polarizations that are orthogonal to each other.

13. The apparatus of claim 12, further comprising a first photodetector to receive a reproduction beam that is reproduced from the holographic information storage medium in the reproduction mode.

14. The apparatus of claim 13, wherein, the first or second half wave plates, on which the first or second beam that are incident thereto from the first optical path changer to the second optical path changer is incident after passing through the second optical path changer, converts a passing beam to a beam comprising a main polarization component and a different polarization component so that in the recording mode, the signal beam reflected by the holographic information storage medium is detected in the first photodetector.

15. The apparatus of claim 8, further comprising a second polarization conversion device on an optical path in which the optical paths of the signal beam and the reference beam are combined by the optical path combining unit,
wherein the holographic information storage medium is formed to convert the polarization state of a beam that is incident on the reflection layer into a different polarized state when the beam is reflected, and
the first polarization conversion device comprises:
a first transparent area to transmit a passing beam without a polarization change irrespective of the recording mode or the reproduction mode; and
a first polarization conversion area to convert a polarization of the passing beam only in the recording mode, and the second polarization conversion device comprises:
- a second transparent area to transmit a passing beam without a polarization change irrespective of the recording mode or the reproduction mode; and
- a second polarization conversion area to convert a polarization of the passing beam only in the recording mode.

16. The apparatus of claim 15, further comprising a quarter wave plate to convert the polarization of an incident beam that is incident thereto, and is disposed between the objective lens and the optical path forming optical system,
   wherein, during the recording mode, the signal beam and the reference beam proceeding to the quarter wave plate from the optical path forming optical system have the same linear polarizations.

17. The apparatus of claim 16, further comprising a first photodetector to receive a reproduction light reproduced from the holographic information storage medium in the reproduction mode.

18. The apparatus of claim 17, wherein:
   during the recording mode, a beam reflected by the holographic information storage medium is returned to the first optical path changer through an optical path not passing through the first and second half wave plates, and
   the apparatus further comprises:
   a third optical path changer which, during the recording mode, separates an optical path of the beam reflected by the holographic information storage medium from the optical path of the beam emitted from the light source so that the reflected beam is not directed to the light source; and
   a second photodetector to detect a servo beam which, during the recording mode, returns from the holographic information storage medium and is separated in the third optical path changer from the reflected beam.

19. The apparatus of claim 1, wherein the signal beam and the reference beam are incident on the same surface of the holographic information storage medium.

20. A method of recording information in a holographic information storage medium using a holographic information recording and/or reproducing apparatus comprising a light source, a polarization conversion device, an optical path forming optical system, a focus adjustment optical system, an objective lens, and a 4f relay system disposed on an optical path between the focus adjustment optical system and the objective lens, the method comprising:
   emitting light from the light source;
   forming a signal beam and a reference beam that are orthogonal to each other from the light emitted from the light source using the polarization conversion device;
   separating the signal beam and the reference beam using the optical path forming optical system so that the signal beam and the reference beam proceed along respective paths, and then, to combine the optical paths thereof;
   focusing the signal beam and the reference beam within the holographic information storage medium using the objective lens, to thereby form an interference pattern thereof and to record information in the form of the interference pattern on the holographic information storage medium;
   varying a position of a focus of at least one of the signal beam and the reference beam in a depth direction of the holographic information storage medium using a focus adjustment optical system; and
   maintaining a predetermined optical distance between the focus adjustment optical system and the objective lens using the 4f relay system.

21. The method of claim 20, wherein the 4f relay system includes a first mirror and a second mirror, at least one of which is arranged to move correspondingly with a movement of the objective lens so as to maintain the predetermined optical distance between the focus adjustment optical system and the objective lens.

22. A holographic information recording and/or reproducing apparatus for use with a holographic information storage medium, the apparatus comprising:
   an optical system to generate a signal beam and a reference beam, and to separate optical paths of the signal beam and the reference beam to proceed along respective paths;
   a focus adjustment optical system disposed on an optical path of at least one of the signal beam and the reference beam, and to vary the position of a focus of at least one of the signal beam and the reference beam in a depth direction of the holographic information storage medium;
   an objective lens to focus the signal beam and the reference beam within the holographic information storage medium, to thereby form an interference pattern to record information on the holographic information storage medium; and
   a 4f relay system disposed on an optical path between the focus adjustment optical system and the objective lens to maintain a predetermined optical distance between the focus adjustment optical system and the objective lens.

23. The apparatus of claim 22, wherein the 4f relay system further comprises a first mirror and a second mirror, at least one of which is arranged to move in proportion to a moving distance of the objective lens to maintain the predetermined optical distance between the focus adjustment optical system and the objective lens.

* * * * *